United States Patent (10) Patent No.: US 6,226,067 B1
Nishiguchi et al. (45) Date of Patent: May 1, 2001

(54) LIQUID CRYSTAL DEVICE HAVING SPACERS AND MANUFACTURING METHOD THEREOF

(75) Inventors: Kenji Nishiguchi, Ikoma; Masakazu Okada, Kyoto; Kiyofumi Hashimoto, Suita, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/163,846

(22) Filed: Sep. 30, 1998

(30) Foreign Application Priority Data

Oct. 3, 1997 (JP) .................................................... 9-271515

(51) Int. Cl.[7] .............................. G02F 1/1339; G02F 1/13
(52) U.S. Cl. ......................... 349/155; 349/156; 349/157; 349/187
(58) Field of Search .................................. 349/155, 156, 349/157, 187

(56) References Cited

U.S. PATENT DOCUMENTS

| 4,249,800 | 2/1981 | Spruijt .................................. 350/320 |
| 5,285,304 | 2/1994 | Hotta et al. ............................ 359/81 |
| 5,453,864 | * 9/1995 | Yamada et al. ....................... 349/182 |
| 5,473,450 | 12/1995 | Yamada et al. ........................ 359/51 |
| 5,556,670 | * 9/1996 | Mihara et al. .......................... 428/1 |
| 5,621,553 | * 4/1997 | Nishiguchi et al. ................... 349/153 |
| 5,682,218 | 10/1997 | Shimizu et al. ....................... 349/156 |
| 5,729,312 | * 3/1998 | Yamagishi et al. .................... 349/155 |
| 5,812,232 | * 9/1998 | Shiroto et al. ....................... 349/155 |
| 5,940,156 | * 8/1999 | Nishiguchi et al. ................... 349/156 |
| 5,952,676 | * 9/1999 | Sato et al. ............................. 349/155 |
| 5,978,064 | * 11/1999 | Nishiguchi ............................ 349/156 |
| 6,064,461 | * 5/2000 | Nishida ................................. 349/155 |

FOREIGN PATENT DOCUMENTS

| 62-203123 | 9/1987 | (JP) . |
| 8-110524 | 4/1996 | (JP) . |
| 9-068698 | 3/1997 | (JP) . |
| 9-197412 | 7/1997 | (JP) . |

* cited by examiner

*Primary Examiner*—William L. Sikes
*Assistant Examiner*—Tarifur R. Chowdhury
(74) *Attorney, Agent, or Firm*—Sidley & Austin

(57) ABSTRACT

Disclosed is a liquid crystal light modulating element comprising a pair of substrates and a liquid crystal modulating layer interposed between the substrates. The liquid crystal modulating layer mainly comprises (1) a liquid crystal material for light modulation, (2) a plurality of spacers for maintaining a gap between the substrates, and (3) a plurality of resin structural nodules for supporting and adhering said pair of substrates. The resin structural nodules are arranged within a light modulating region based on a predetermined principle or a predetermined pattern.

24 Claims, 11 Drawing Sheets

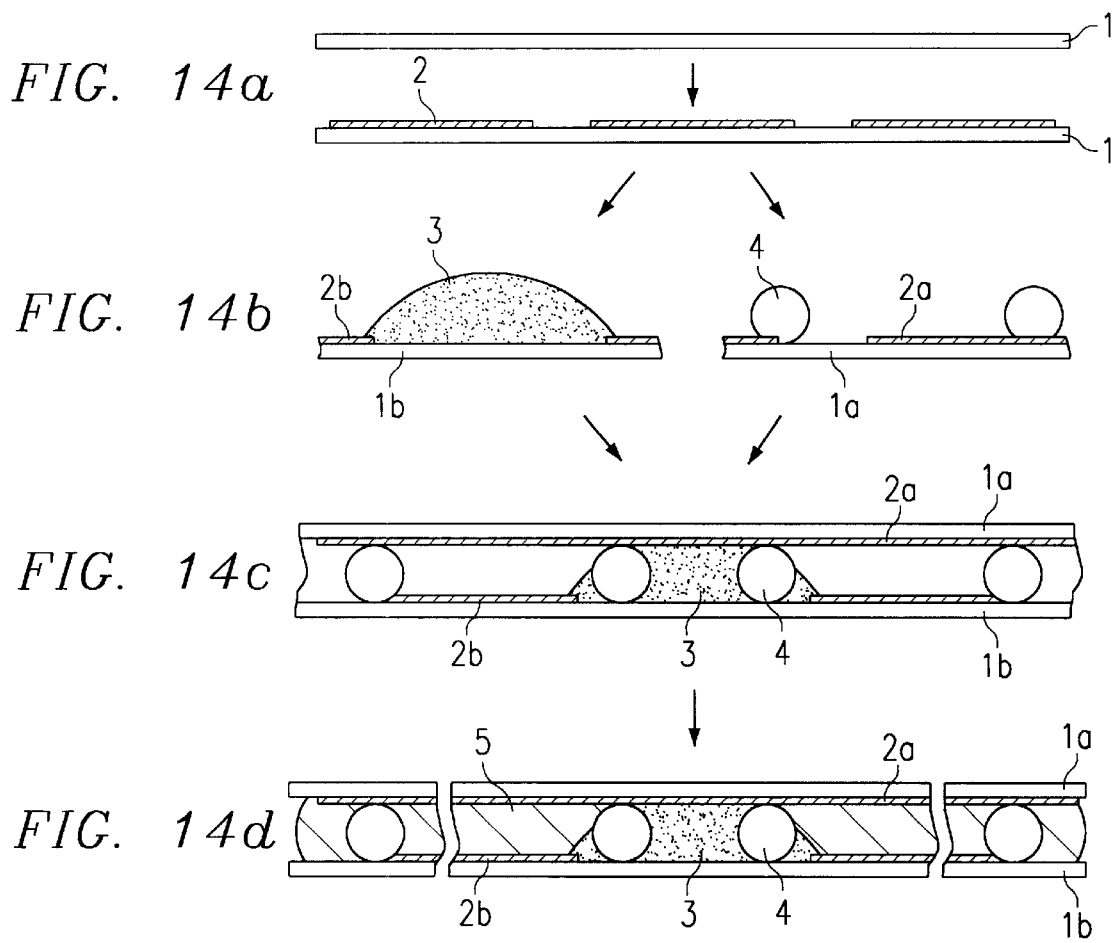
FIG. 14a
FIG. 14b
FIG. 14c
FIG. 14d
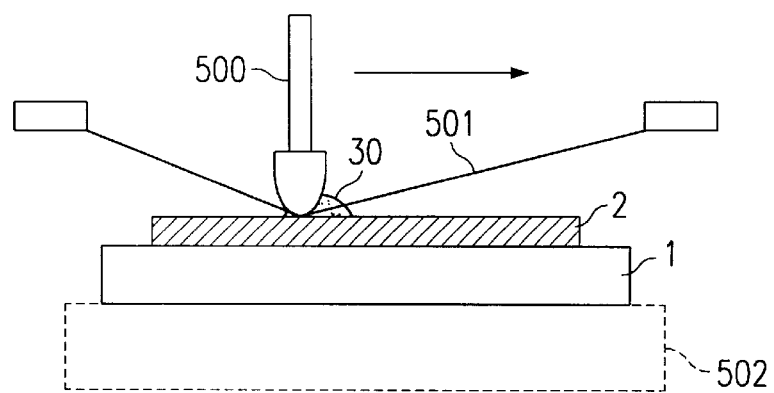
FIG. 15

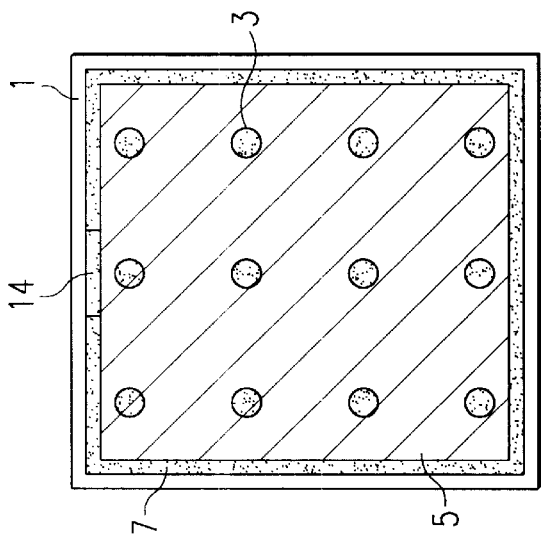
FIG. 27a   FIG. 27b   FIG. 27c
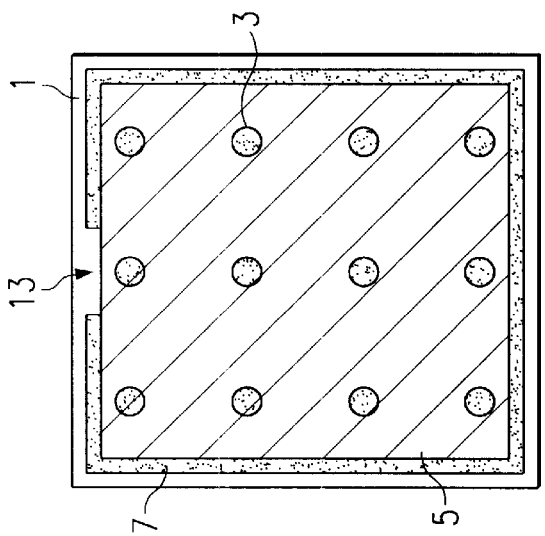
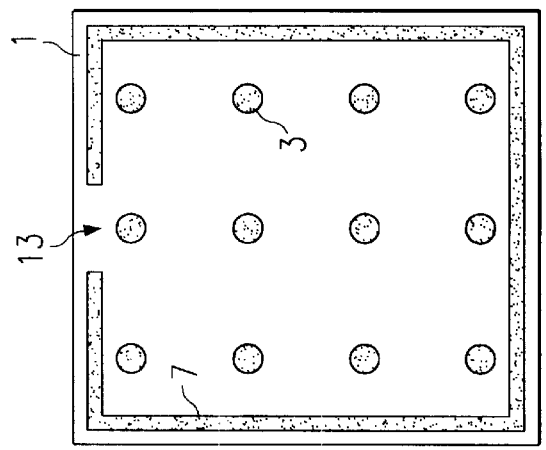
FIG. 31

LIQUID CRYSTAL DEVICE HAVING SPACERS AND MANUFACTURING METHOD THEREOF

CROSS-REFERENCED APPLICATIONS

This application is based on patent application No. HEI 9-271515 filed in Japan, the entire contents of which are hereby incorporated by reference.

BACKGROUND OF THE INVENTION

1. Field of the Invention

The present invention relates to a liquid crystal light modulation element and method of manufacturing same.

2. Description of the Related Art

Conventional liquid crystal light modulation elements are widely known to use a liquid crystal material as a light shutter sandwiched in a space between two substrates. There is known art for maintaining the size of the gap between said substrates in this liquid crystal light modulation element. Such art is known, for example, to provide a seal member of a predetermined thickness along the edges of said substrates, and disperse microparticles of silica or the like as spacers between said substrates.

In recent years the uniformity of the gap between substrates has become more important in conjunction with increasingly high quality and increasing large surface area of the liquid crystal light modulation elements. Conventional liquid crystal light modulation elements are disadvantageous, however, insofar as it is difficult to adequately control the uniformity of the gap between substrates within the light modulation range, such that display irregularities are produced which prevent high quality display from being achieved. Management of this substrate gap is a parameter which determines the display characteristics particularly in liquid crystal light modulation elements using ferrodielectric liquid crystals, and reflective-type liquid crystal light modulation elements using cholesteric (chiral nematic) liquid crystals with circular dichroism. In ferrodielectric liquid crystal light modulation elements, display performance is reduced due to irregular gap between substrates which produces an irregular liquid crystal arrangement. Furthermore, display irregularities become pronounced due to the reduced threshold characteristics when driving elements with a memory such as cholesteric liquid crystal elements.

U.S. Pat. No. 4,249,800 discloses a liquid crystal display device which uses glass beads with an overcoat layer of thermoplastic resin as spacers. This publication gives as an example spacers arranged on a substrate via a so-called photolithography method including photo masking and exposure of a substrate on which has been applied a dispersion of glass beads in a photosensitive lacquer. Another example given pertains to the arrangement of spacers on a substrate via a silk-screening method.

The aforesaid methods include the laborious task of manufacturing glass beads coated with a resin for use as spacers. Since only a small amount of the thermoplastic resin comprising the surface protective coating of the glass beads is in contact with the substrate, adequate adhesion cannot be obtained. It is also difficult to accurately arrange these spacers at optional positions due to the small size of the spacers themselves, thus essentially making it difficult to eliminate display irregularities.

U.S. Pat. No. 5,285,304 discloses a ferrodielectric liquid crystal element crimped between substrates having a dispersion of adhesive type thermosetting particles non-adhesive type thermoplstic particles respectively having a diameter of about 1.5–5 times the thickness of the liquid crystal layer. Japanese Laid-Open Patent Application No. HEI 8-110524 discloses a method wherein a gap controlling material which is not deformable by heat, and a gap controlling material which is deformable by melting or softening then hardened so as to provide adhesive power to both substrates are applied to two substrates, and the latter material is melted or heated above a softening temperature so as to adhere to both substrates.

In the methods of the aforesaid disclosures, however, the polymer particles and gap controlling materials are applied on the substrates, the gap controlling material or polymer particles adhering to the substrates cannot be arranged at desired positions. Therefore, the polymer particles and gap controlling material tend to flocculate during application. As a result, the liquid crystal material is poorly oriented at the locations of said flocculation, which produces an area of inadequate light modulation and prevents obtaining a suitably high quality display.

Japanese Laid-Open Patent Application No. SHO 62-203123 discloses a liquid crystal light modulation element, the object of which is to cut the optional size of the liquid crystal light modulation element using an elongated flexible substrate. This liquid crystal light modulation element is formed using a resin dam of high polymer material in a matrix like continuous coating across the entire surface of a transparent flexible substrate instead of the conventional particle like spacers previously described. This disclosure further states that an adhesion force is generated between said resin dam and said substrates by light pressure. The specific example is given that the resin dam is formed by photolithography using a photoresist, or offset printing of UV hardened resin, and the substrates are bonded by lightly pressing the substrates together at 80° C.

Even when the resin dam is formed as a matrix, for example, it is difficult to realize an accurate gap between substrates only by said resin dam. Furthermore, in the above example, the resin construction material itself is UV hardened resin that must be pressed lightly at about 80° C. to bond the substrates by achieving suitable adhesion. Therefore, a further disadvantage arises in that the application of external pressure and sudden temperature change may produce lumps which increase the gap between the substrates so as to cause improper light modulation by the liquid crystal layer.

Use of a photopolymerizable material to form a resin structural material adhered on top and bottom substrates has been proposed from the perspective of adhesion of the resin structural material. For example, U.S. Pat. No. 5,473,450 discloses a liquid crystal light modulation element formed by a resin wall via photopolymerization phase separation using a photomask. U.S. Pat. No. 5,682,218 discloses a method wherein liquid crystal and unhardened resin are separated by cooling isotropic phase liquid crystal/resin (monomer) mixture, and subsequently hardening the unhardened resin via heat or ultraviolet light to form hardened resin rods.

A disadvantage arises in methods using photopolymerizable materials in that unhardened monomer and polymerization initiator remain in the liquid crystal even after polymerization, thereby affecting the operating characteristics and contrast of the liquid crystal. The resin structural component itself readily produces irregularities that affect the substrate gap.

Japanese Laid-Open Patent No. HEI 9-197412 discloses a liquid crystal light modulation element comprising a light shield area of a liquid crystal display panel provided with a color filter, i.e., an adhesive layer formed of thermoset epoxy resin on a black matrix, formed by silk-screen printing or transfer method, wherein a spacer is fixedly anchored only in said light shield area so as to suppress the poor display qualities caused by flocculation of the spacer.

The resolution of silk-screen printing or transfer methods is nearly 10× lower compared to the size of the spacer size so as to cause flocculation of the spacer. Since the adhesive layer is not provided on both substrates, adequate adhesive force cannot be maintained between the substrates. Consequently, a further disadvantage arises in that the application of external pressure and sudden temperature change may increase the gap between the substrates.

Japanese Laid-Open Patent Application No. HEI 9-68698 discloses a liquid crystal display panel having a structure of a plurality of high polymer walls comprised of polyimide in the presence of ether-bonded polyurethane. This liquid crystal display panel provides a chiral nematic liquid crystal encased by macromolecular walls to form a liquid crystal domain.

In this display, however, after the ether-bonded polyurethane is mixed with liquid crystal material and photopolymerizable oligomer, the photopolymerizable oligomer is photopolymerized to form a macromolecular member which completely encases liquid crystal drops, and similar to the previously mentioned art, gives rise to disadvantages such as residual unreacted monomer and resin which prevents attaining a high quality display.

The conventional art described above does not presently provide high quality display without display irregularities and the like, not liquid crystal light modulation element capable of maintaining suitable uniformity of the gap between substrates even when using film substrates or large substrates. Neither does the conventional art provide an element structure of a sufficiently high degree of manufacturability.

SUMMARY OF THE INVENTION

An object of the present invention is to provide a novel and serviceable liquid crystal light modulation element capable of maintaining a uniform gap between substrates even when using film substrates and large substrates.

An object of the present invention is to provide a novel and serviceable liquid crystal light modulation element and method for manufacturing same so as to efficiently manufacture liquid crystal light modulation elements having a uniform gap between substrates.

The present inventors have discovered in the course of in-depth investigations a novel and serviceable liquid crystal light modulation element capable of maintaining a uniform gap between substrates whether film substrates or large substrates are used and regardless of the simplicity of structure by supporting and adhering top and bottom substrates via a resin structure nodules principally comprising thermoplastic macromolecular material arranged based on a predetermined arrangement principle, and a spacer within the light modulation range. The present inventors have also discovered a novel method of manufacture capable of producing high quality liquid crystal light modulation elements with an extremely high production efficiency.

One aspect of the present invention is a liquid crystal light modulation element including at least a pair of substrates at least one of which is transparent, and a liquid crystal light modulation layer interposed between said pair of substrates, wherein said liquid crystal light modulation layer is provided with a liquid crystal material for light modulation, spacers for maintaining the gap between said substrate at a predetermined size, and resin structural nodules, the main component of which is a thermoplastic high molecular material which supports and adheres said pair of substrates via an arrangement based on a predetermined principle within the light modulation range.

One aspect of the present invention is a method for manufacturing a light modulation element including a first process of arranging spacers on at least one substrate among a pair of substrates to provide a desired gap between substrates, a second process for forming resin structural nodules which are thicker than the thickness of the light modulation layer on at least one substrate among a pair of substrates based on a predetermined arrangement principle, a third process for overlaying a substrate on which are formed said resin structural nodules on another substrate, a fourth process for heating the resin material comprising said resin structural nodules to a temperature above its softening temperature and applying pressure on said pair of overlaid substrates, and a fifth process for cooling said heated pair of substrates to a temperature less than the softening temperature of the resin material comprising said resin structural nodules. The aforesaid first and second processes may be combined in the same process, or may be separate processes. In the case of separate processes, the sequence of the first and second processes are not specifically limited.

These and other objects, advantages and features of the invention will become apparent from the following description thereof taken in conjunction with the accompanying drawings which illustrate specific embodiments of the invention.

Figure 1:
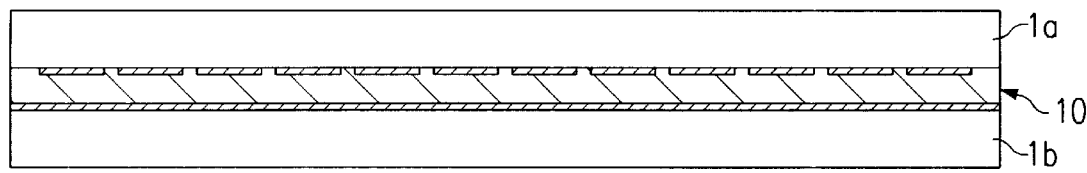
FIG. 1 is a section view briefly showing the structure of a liquid crystal light modulation element of one embodiment of the invention.
Figure 6:
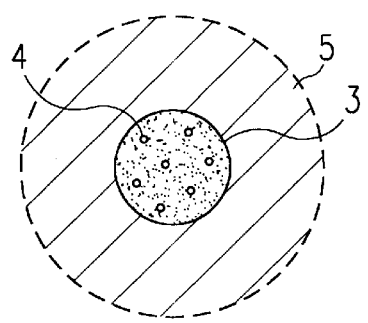
Figure 7:
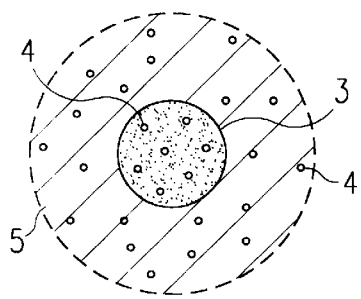
Figure 8:
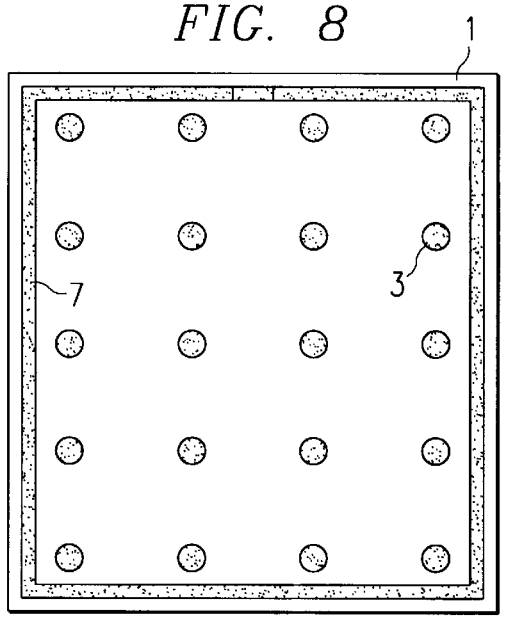
Figure 9:
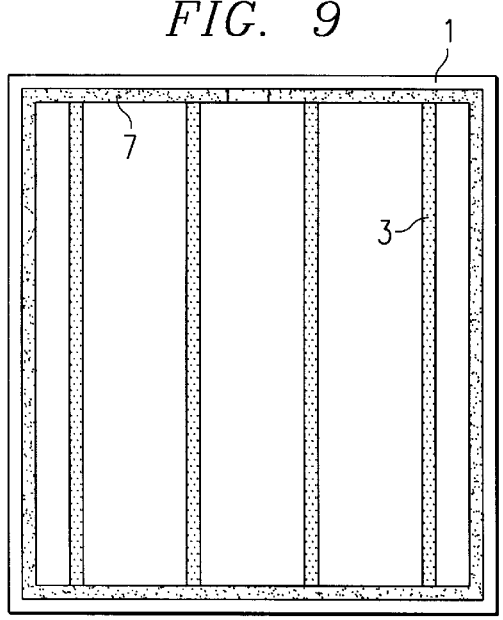
Figure 10:
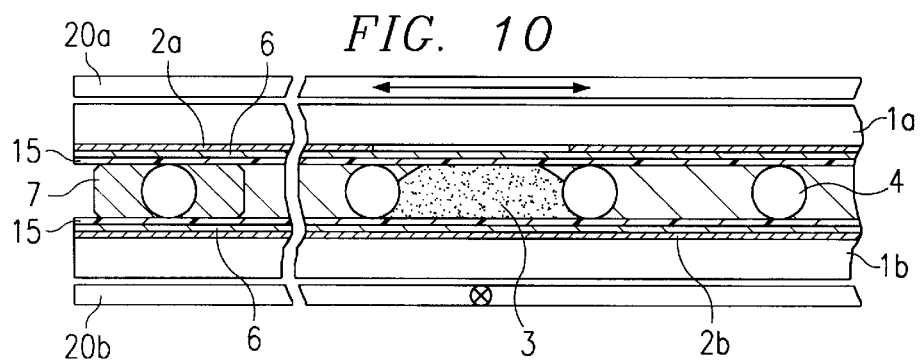
Figure 11:
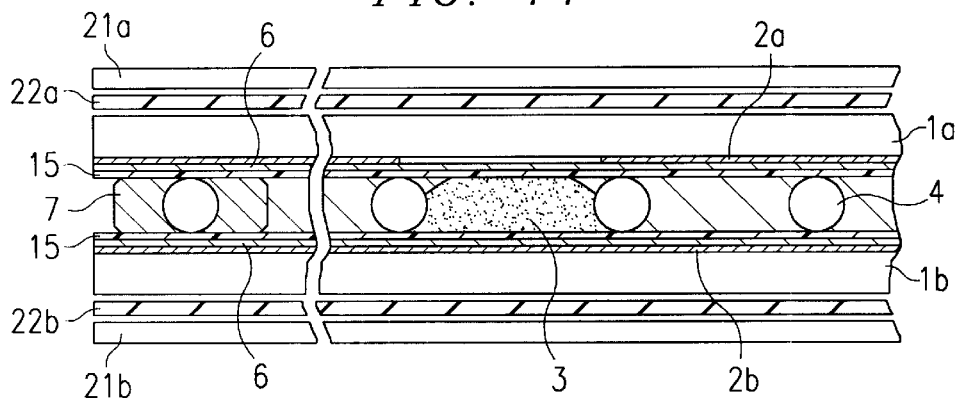
Figure 12:
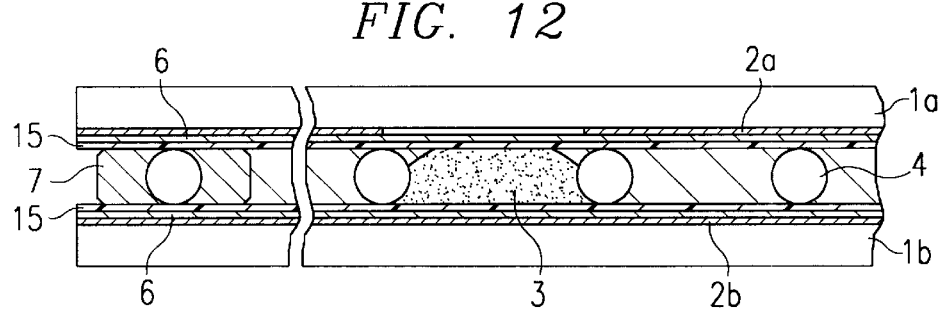
Figure 13:
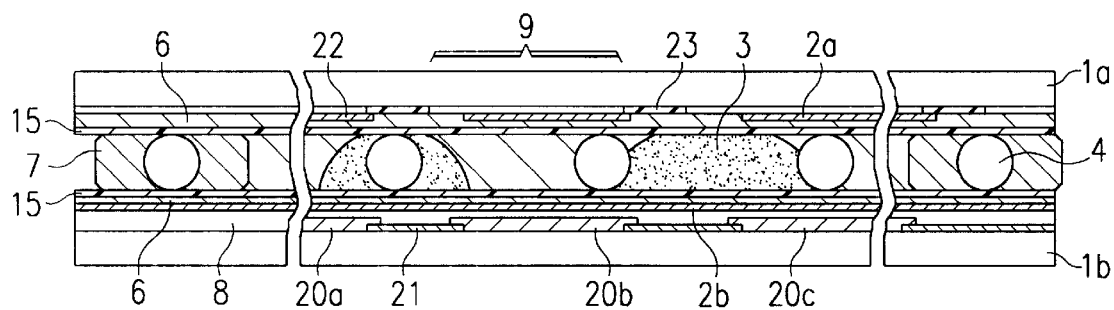
Figure 16:
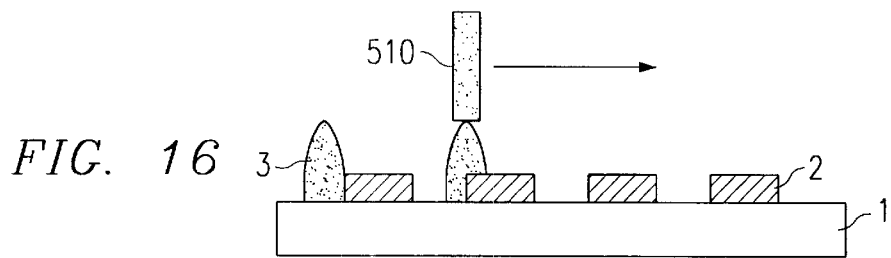
Figure 17:
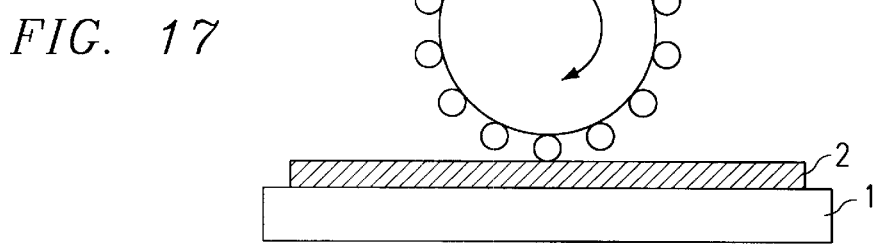
Figure 18:
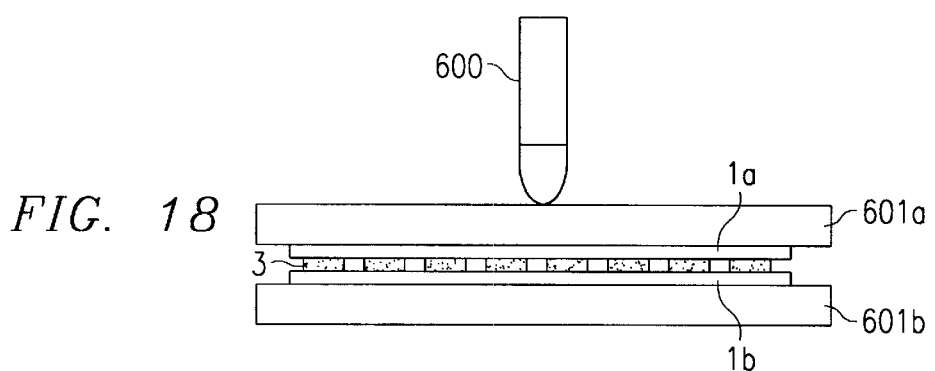
Figure 19:
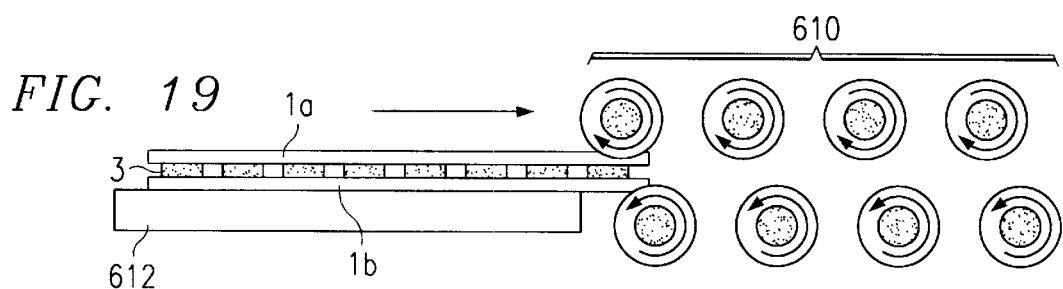
Figure 20:
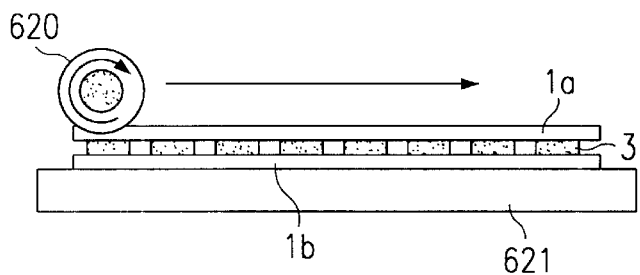
Figure 21A:
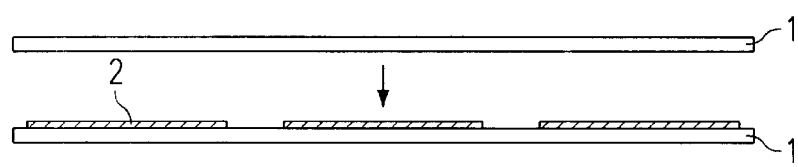
Figure 21B:
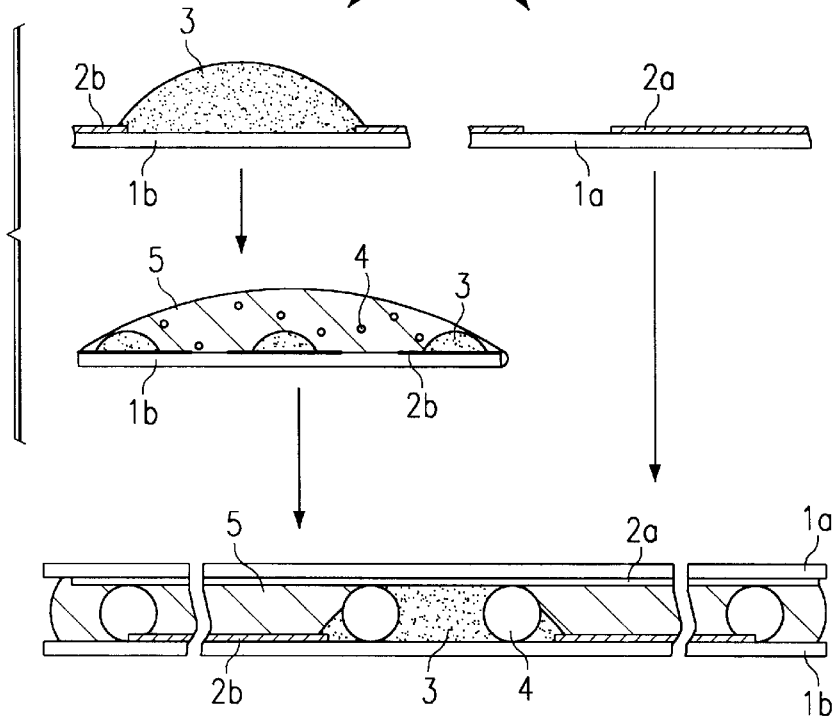
Figure 21C:
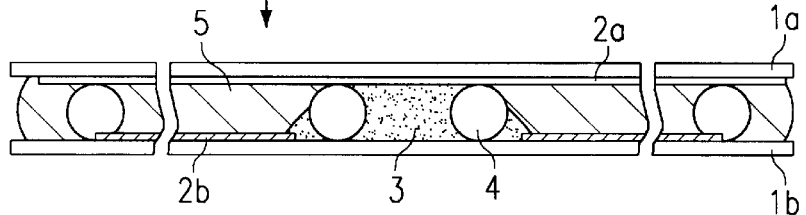
Figure 22:
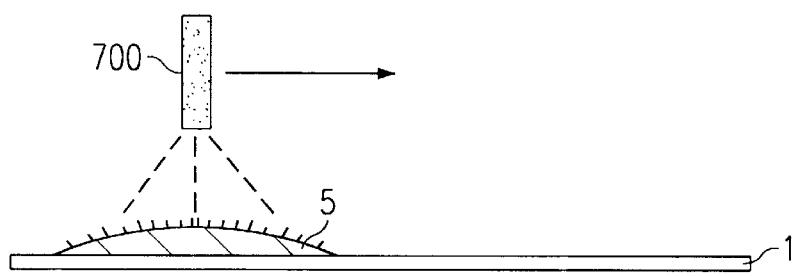
Figure 23:
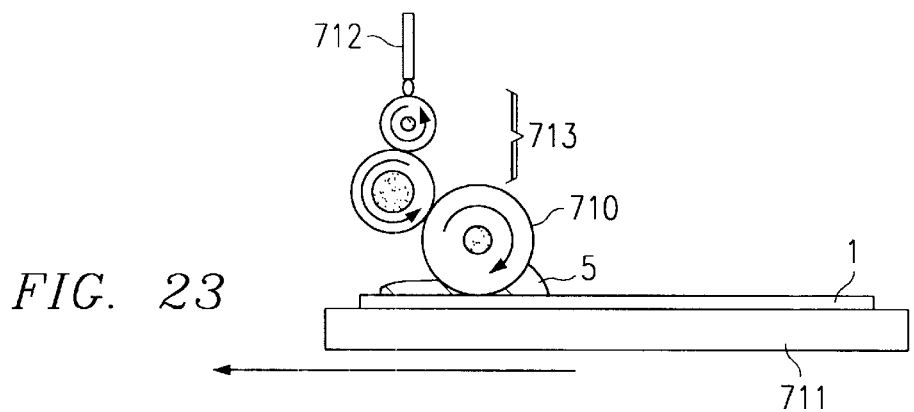
Figure 24A:
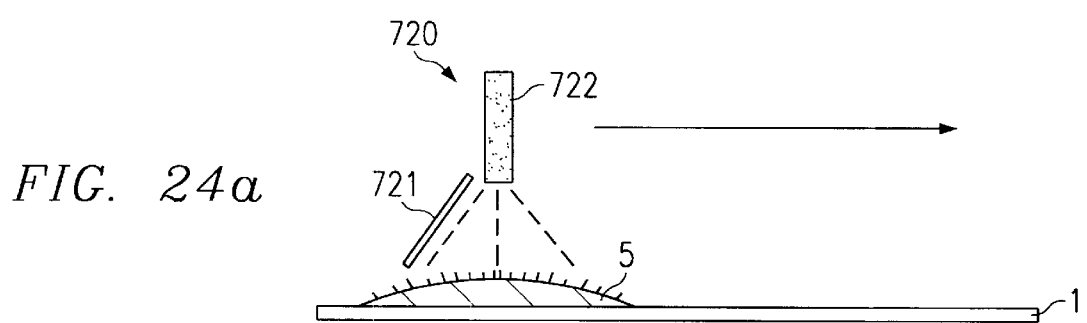
Figure 24B:
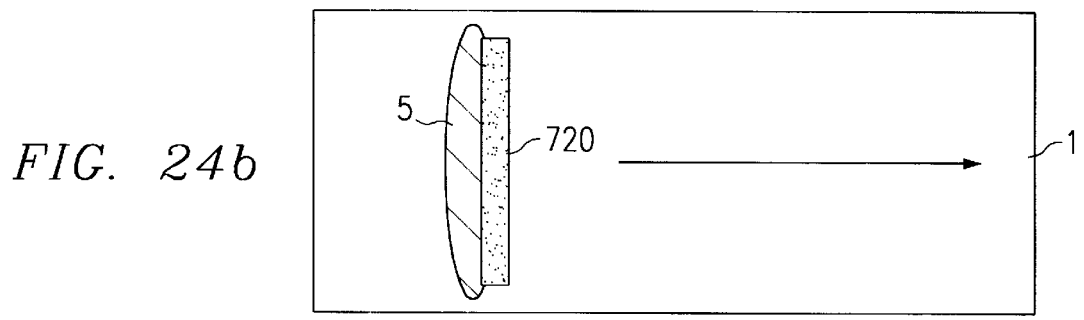
Figure 25:
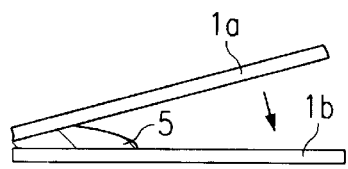
Figure 26:
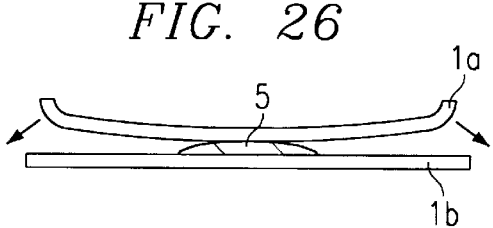
Figure 28:
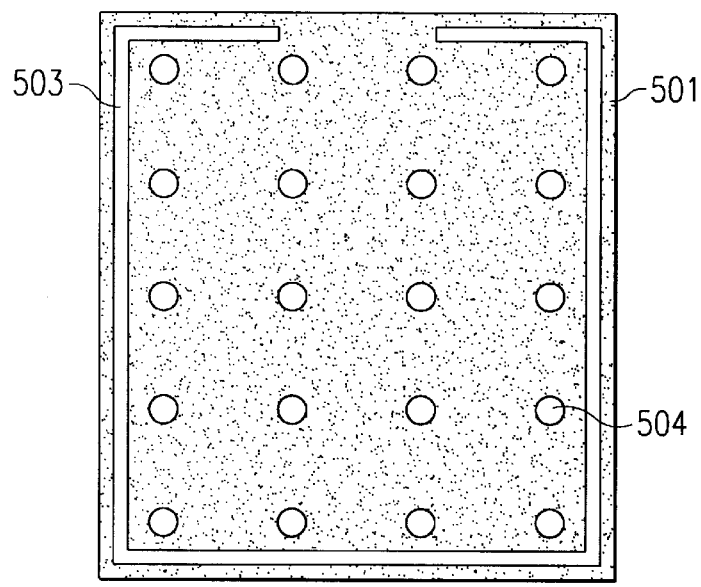
Figure 29:
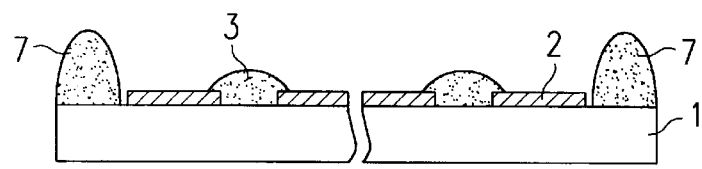
Figure 30:
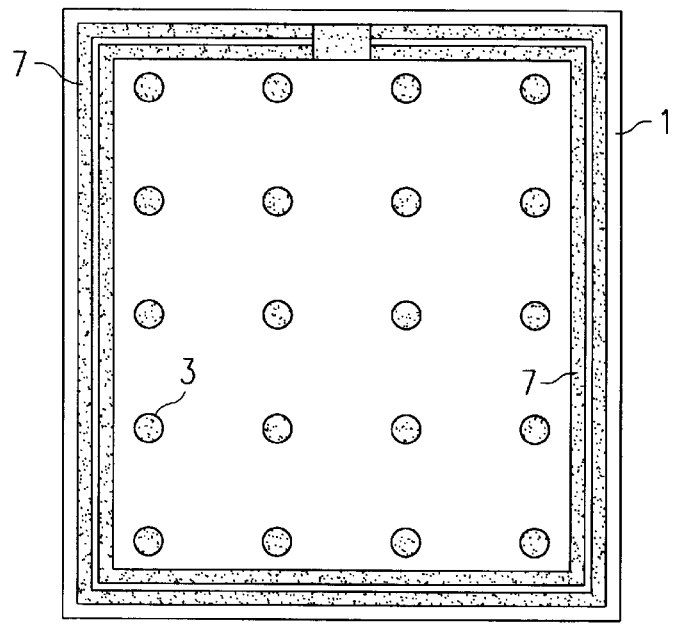
Figure 32:
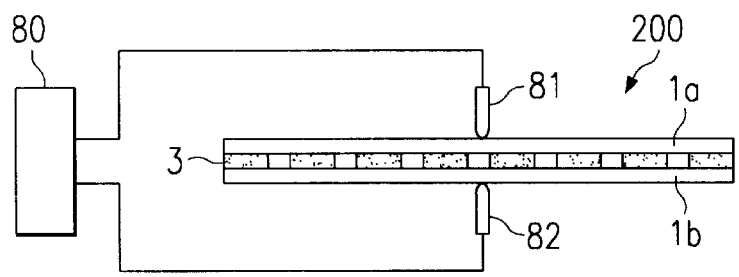
Figure 33:
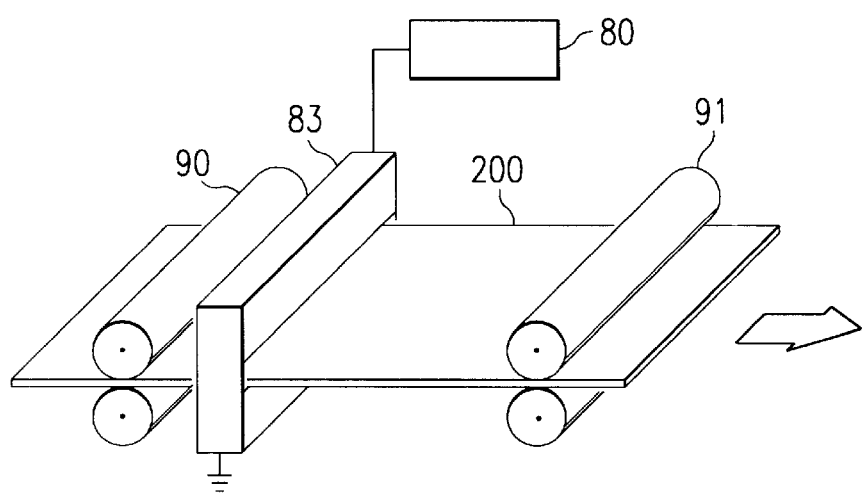
Figure 34:
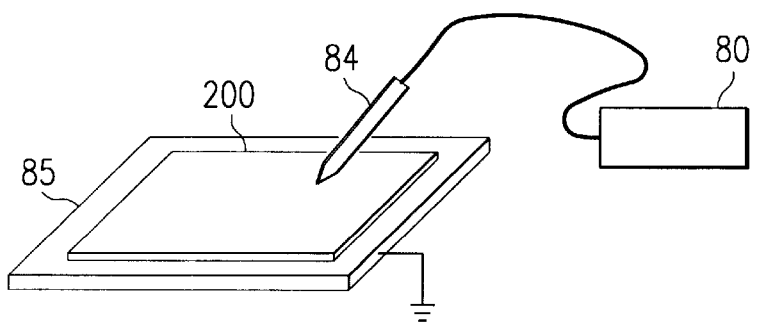

5 FIG. shows the positional relationship between the spacer and the resin structural nodules;

FIG. 6 shows an example including a spacer with the resin structural nodules;

FIG. 7 shows an example of a spacer on the exterior of the resin structural nodules;

FIG. 8 shows an example provided with a seal;

FIG. 9 shows stripe-like resin structural nodules;

FIG. 10 shows a practical example of a liquid crystal light modulation element having the basic structure shown in FIG. 1;

FIG. 11 shows another practical example of a liquid crystal light modulation element;

FIG. 12 shows still another practical example of a liquid crystal light modulation element;

FIG. 13 shows yet another practical example of a liquid crystal light modulation element;

FIGS. 14a–14d illustrate the method for manufacturing a liquid crystal light modulation element;

FIG. 15 illustrates the formation of resin structural nodules via a printing method;

FIG. 16 illustrates the formation of resin structural nodules via a dispenser method;

FIG. 17 illustrates the formation of resin structural nodules via a transfer method;

FIG. 18 shows one embodiment of adhered substrates;

FIG. 19 shows another embodiment of adhered substrates;

FIG. 20 shows still another embodiment of adhered substrates;

FIGS. 21a–21c illustrate another method for manufacturing a liquid crystal light modulation element;

FIG. 22 shows an example of a liquid crystal drip method;

FIG. 23 shows another example of a liquid crystal drip method;

FIGS. 24a and 24b show other examples of a liquid crystal drip method;

FIG. 25 illustrates a method for overlaying substrates;

FIG. 26 illustrates another method for overlaying substrates;

FIGS. 21a–27c show the state of injection of liquid crystals;

FIG. 28 shows an example of a metal mask;

FIG. 29 illustrates the seal formation;

FIG. 30 shows an example of multiple seals;

FIG. 31 illustrates the cell gap measurement results;

FIG. 32 is a section view of the liquid crystal display sheet of another embodiment of the invention;

FIG. 33 shows the method of applying a voltage to the liquid crystal display sheet; and FIG. 34 shows another method of applying a voltage to the liquid crystal display sheet.

DETAILED DESCRIPTION OF THE PREFERRED EMBODIMENTS

The preferred embodiments of the present invention are described hereinafter with reference to the accompanying drawings. The present invention is not limited to the following examples, and may be variously modified and improved.

First Embodiment

FIG. 1 shows an example of the present invention, a section view briefly showing the structure of a liquid crystal light modulation element of a simple matrix-driven type. As shown in FIG. 1, this liquid crystal light modulation element provides a liquid crystal light modulation layer 10 interposed between a pair of substrates 1a and 1b.

Figure 2A:
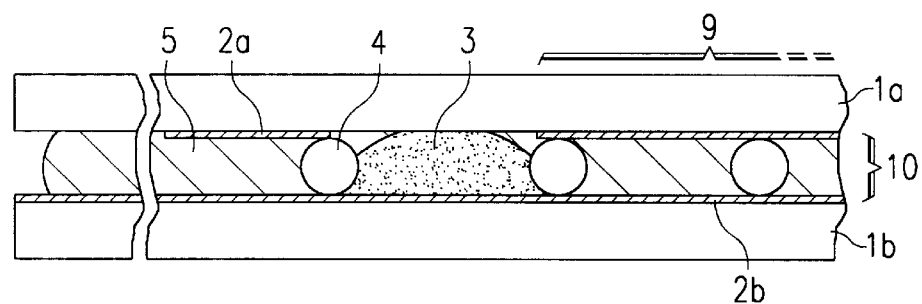
FIGS. 2a and 2b are section views showing the essential part of the liquid crystal light modulation element of FIG. 1.
Figure 2B:
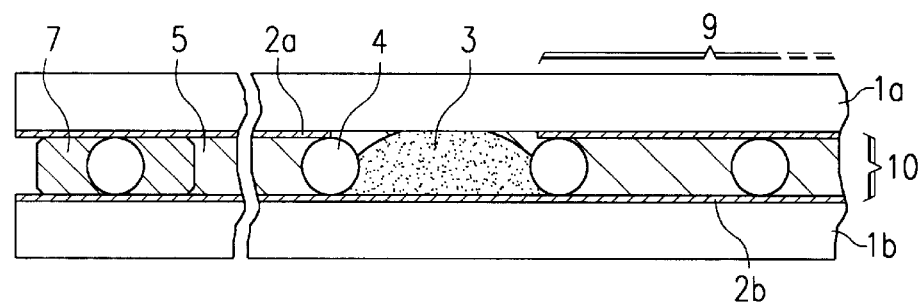

FIGS. 2a and 2b are enlargements of the essential part of FIG. 1. As shown in FIG. 2a, a plurality of stripshape electrodes 2a and 2b are formed on substrates 1a and 1b, wherein a resin structural layer 3 of pillar-like cross section is adhered to both top and bottom substrates on the side bearing said electrodes 2a and 2b. A spacer 4 is interposed between substrates 1a and 1b, to set the gap between said substrates. Liquid crystal light modulation layer 10 comprises a resin structural nodule 3, spacer 4, and liquid crystal material 5 loaded therebetween.

The region in which strip-shape electrodes 2a and 2b are overlaid comprises pixel 9. In the present specification, a region which displays light modulation via liquid crystal material is referred to as a light modulation region. In this example, a region containing a plurality of pixels is a light modulation region, and the border region which does not contain pixels is outside the light modulation region.

At least one substrate among substrates 1a and 1b is a transparent substrate. In the case of a transmission type liquid crystal light modulation element, both substrates 1a and 1b are transparent. In the case of a reflective type liquid crystal light modulation element, at least one substrate is transparent, and the other substrate may be provided with a thin light blocking film such as a metal film or the like, or may be colored. Transparency not only means to uniformly transmit all light component in the visible light range, but also includes the transmission of light only of specific wavelength among the visible light range. In the following discussion, the term transparency has the aforesaid meanings.

Examples of substrates usable as the aforesaid transparent substrate include, in addition to glass substrate, various flexible substrates such as polycarbonate, polyether sulfone (PES), polyethylene terephthalate and the like.

The plurality of electrodes 2a and 2b of substrates 1a and 1b may be used as electrodes to control the liquid crystal light modulation element as necessary. Such electrodes may be metal electrodes of aluminum, silicon or the like, transparent conductive film represented by indium tin oxide (ITO), or photoconductive film such as amorphous silicon, bismuth silicon oxide (BSO) and the like. An electrode structure of the active matrix type may also be used by forming a thin layer transistor connected to a plurality of pixel electrodes as described later. These electrodes themselves may be used as the substrates rather than providing them on the substrates between which the liquid crystal light modulation layer is interposed. When the liquid crystal light modulation element is a reflective type element or optical recording type element, one or another electrode provided on the substrate may be transparent. The other electrode may be may be a non-transparent electrode formed of a metal layer, conductive high molecular layer or the like.

As shown in FIG. 2b, a seal 7 for sealing in the liquid crystal material 5 may be provided on the exterior edge of the substrate outside the light modulation region.

Figure 3A:
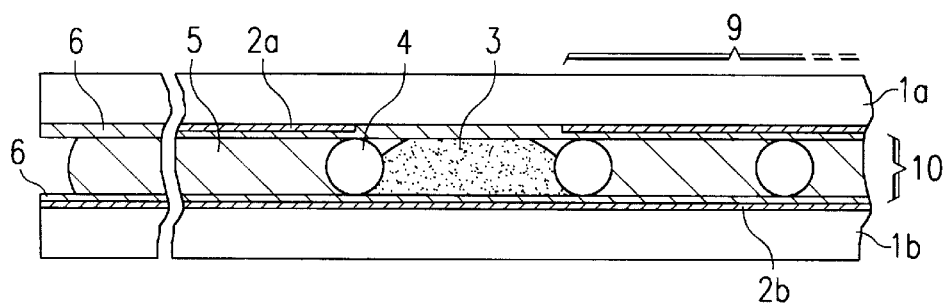
FIGS. 3a and 3b show examples of providing an insulation layer.

As shown in FIG. 3a, an inorganic film such as silicon oxide or organic layer such as polyamide resin and the like, epoxy resin and the like may be provided as an insulation layer 6 or gas barrier layer on the surface of strip-shape electrodes 2a and 2b. In this instance, shorting between the substrates is prevented, and reliability of the liquid crystal light modulation element is improved.

Figure 3B:
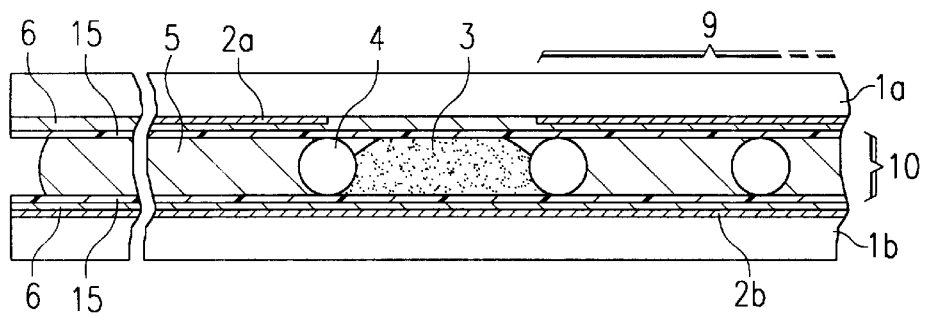

As shown in FIG. 3b, an orientation layer 15 represented by polyimide may be provided as necessary on the electrodes 2a and 2b. Liquid crystal molecules may be arranged in optional direction on the surface of the orientation layer 15 via a rubbing process, to allow use of the liquid crystal light modulation element in modes utilizing the orientation of the liquid crystal material such as twisted nematic (TN) mode, super twisted nematic (STN) mode, ferrodielectric liquid crystal (FLC) mode, implant switching (IPS) mode, vertical align (VA) mode, electrically controlled birefringence (ECB) mode, cholesteric nematic phase transition guest-host mode and the like. Orientation layer 15 is desirably formed after aligning the insulation layer 6, as shown in FIG. 3b.

Figure 4:
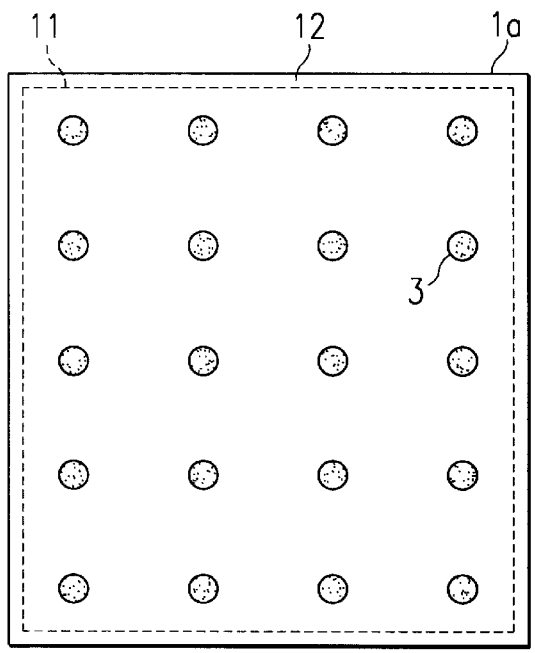
FIG. 4 shows the arrangement of resin structural material of the liquid crystal light modulation element.

FIG. 4 shows the arrangement of resin structural nodules 3. As shown in FIG. 4, the resin structural nodules 3 within the liquid crystal light modulation region may be dot-like, e.g., cylindrical column, rectangular column, or ovoid columns, arranged at equal distances based on a predetermined arrangement rule such as a lattice array or the like.

By forming the resin structural nodules in a dot-like configuration, the aperture ratio of the liquid crystal light modulation element can be maintained at higher level, adhesion between top and bottom substrates is increased, and a solid element is obtained which is strong relative to bending and vibration. Dot-like resin structural nodules desirably have a diameter of less than 200 µm in consideration of adhesion qualities and display characteristics, and desirably have a dot size of 10 µm or greater in consideration of ease of manufacture. When the dot-like resin structural nodules are formed on the liquid crystal light modulation element which comprise pixels via matrix electrodes, large pixels can be constructed to increase the intensity of the element formed by a plurality of individual resin structural nodules within said pixel. Conversely, when the pixels are small, the surface area of a plurality of pixels can be supported by a single resin structural nodule.

The array pitch and size of the dot-like resin structural nodule may be suitably selected by pixel resolution and size of the liquid crystal light modulation element. It is desirable to prioritize the dot-like resin structural nodule arrangement between electrodes to elevate the aperture ratio.

The material used for the resin structural nodule is a material which is softened by heating and solidified by cooling. An optimum material is an organic material having suitable elasticity without chemically reacting with the liquid crystal material used. It is desirable to use a thermoplastic high molecular material as the aforesaid resin material.

Examples of useful thermoplastic high molecular materials include polyvinylchloride resin, polyvinylidene chloride resin, polyvinylacetate resin, polymethacrylate ester resin, polyacrylate ester resin, polystyrene resin, polyamide resin, polyethylene resin, polypropylene resin, fluoride resin, polyurethane resin, polyacrylonitrile resin, polyvinylether resin, polyvinylketone resin, polyether resin, polyvinylpyrrolidone resin, saturated polyester resin, polycarbonate resin, chlorinated polyether resin and the like. The resin structural nodules may be formed using materials comprising at least one or more such materials.

Although the size of the resin structural nodules having an adhesion of a specific degree to support the top and bottom substrates becomes an issue, suitable strength as a liquid crystal light modulation element can be obtained if the surface area of the adhered part of the resin structural nodule after heating and pressure is more than 1% of the surface area occupied within the light modulation region. Although the surface area of the light modulation area becomes smaller in accordance with an increase in the surface area of the resin structural nodule occupied within the light modulation region, adequate characteristics for practical use as a liquid crystal light modulation element can be obtained if the ratio of the surface area occupied by the resin structural nodule is less than 40%.

Particles of hard material which are not deformed by heat or pressure are desirable as the spacer for used to control the gap between substrates, e.g., inorganic material such as fine glass fibers, ball-like silicon glass, alumina powder and the like, and organic synthetic sphere-like particles such as divinylbenzene cross-linking polymer, polystyrene cross-linking polymer and the like.

The spacer size may be suitably determined to match the size of the gap between substrates, and is desirably 1–20 µm. The ratio of the size relative to the resin structural nodule is desirably about 1/2–1/200. It should be noted that the size of the spacer referred to above is measured in the direction of the gap, while the size of the resin structural nodule is measured in a direction transverse to the gap.

Figure 5:
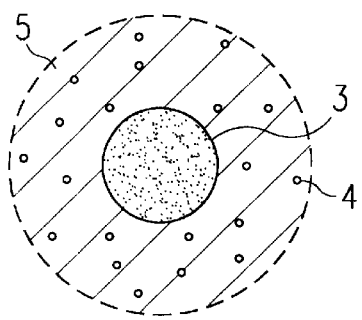

In the present example, spacer 4 is dispersed in liquid crystal material 5 of liquid crystal modulation layer 10, as shown in FIG. 5, however, spacer 4 may be included in resin structural nodules 3 itself, as shown in FIG. 6, or may be included in both liquid crystal material and resin structural nodules 3, as shown in FIG.7.

In the aforesaid liquid crystal light modulation element, there is firm support across the entire surfaces of both substrates by providing hard spacers to maintain the gap between two substrates at a predetermined size, and the resin structural nodules having as a main component a thermoplastic high molecular material to adhere and support said pair of substrates in an arrangement based on a predetermined arrangement principle within the light modulation region, so as to effectively eliminate irregular orientation, and bubble generation under low temperature environmental conditions.

FIG. 8 is a top view showing a seal 7 provided between substrates 1a and 1b to seal the liquid crystal material 5 on the exterior edge of the substrate outside the light modulation region.

In addition to a dot-like shape, the resin structural nodules 3 may be stripe-like nodules arranged at predetermined spacing as shown in FIG. 9. Forming stripe-like resin structural nodules reduces the aperture ratio compared to the dot-like formation, increases the adhesion between the resin structural nodules and the substrates by increasing the adhesive surface area, and provides a stable element. Forming stripe-like resin structural nodules provides a dam within the liquid crystal light modulation area, and is advantageous in preventing flow of the liquid crystal material within the liquid crystal light modulation area. When stripe-like resin structural nodules are formed on the liquid crystal light modulation element comprised of pixels via matrix electrodes, it is desirable, in order to increase the aperture ratio as much as possible, to form the resin structural nodules along the electrodes between the band-like electrodes, and it is further desirable that the width of the stripe-like resin structural nodules is 10–200 µm just as in the case of the dot-like resin structural nodules previously described.

The shape and arrangement of the resin structural nodules may be variously modified and is not specifically limited to the modes described above. The distribution of the resin material is not a random arrangement, but rather is a distribution arraying the resin structural nodules at equal spacing, gradually changing spacing, or predetermined pattern of arrangement with a uniformly repeating periodicity, i.e., an arrangement based on a constant principle so as suitably support the substrate gap and avoid hindering the image display. From the perspectives of ease of manufacture and practicality, effective shapes of the resin structural nodules within the liquid crystal light modulation region are the dots and stripes shown in FIGS. 8 and 9.

The liquid crystal material 5 used in the liquid crystal light modulation layer may be suitably selected in accordance with the display operation mode of the liquid crystal light modulation element being manufactured. For example, TN type crystals, STN type crystals, cholesteric nematic phase-transition type crystals may be used. Furthermore, liquid crystal material having selectively reflective wavelength in the visible light range, and added chiral material in the nematic crystal such as cholesteric liquid crystal and the like, and ferrodielectric liquid crystal having a smectic phase, and antiferrodielectric liquid crystal may be used.

The liquid crystal light modulation element provided with the basic structure described above may be used in any well known display operating mode. Examples of well known display modes of which this element is capable include TN mode, STN mode, ferrodielectric liquid crystal mode, antiferrodielectric liquid crystal mode, high molecular distribution type liquid crystal mode, axially symmetric array mode, electrical controlled birefringence mode, hybrid field effect mode, in-plane switching mode, phase-transition mode using a smectic liquid crystal having a electroclinic effect, dynamic dispersion mode, guest-host mode, selective reflection color mode using a cholesteric liquid crystal, liquid crystal complex layer and the like.

At this time, the birefringence of the liquid crystal may be used to improve light transmission and blocking, by arranging a polarization panel and phase difference panel on bilaterally (top and bottom) on the liquid crystal light modulation element. The orientation layer may be subjected to a rubbing process as necessary. FIG. 10 shows an FLC type or TN type liquid crystal light modulation element having polarization panels 20a and 20b disposed so as to have the polarization angle at a right angle to the top surface and bottom surface, respectively.

FIG. 11 an STN type liquid crystal light modulation element having phase difference panels 22a and 22b and polarization panels 21a and 21b respectively disposed on the top surface and bottom surface. FIG. 12 shows the construction of a cholesteric nematic phase-transition type liquid crystal light modulation element, and selective reflection cholesteric type liquid crystal light modulation element.

When a liquid crystal light modulation element is used as a color display element, a color filter, dichroic color element or the like may be used. A plurality of liquid crystal light modulation elements may be combined as color display elements.

The liquid crystal light modulation element of the present example is not only usable as a simple matrix driven type liquid crystal light modulation element, but is also usable as a liquid crystal light modulation element of the active matrix driven type having active elements such as thin film transistor (TFT), metal insulator (MIM) and the like.

The cell of FIG. 13 has the following construction. Pixel electrode 22 are provided one-to-one relative to pixel 9 arranged in a matrix. The scan line in the display plane of the liquid crystal panel is formed such that each scan line corresponds to a row of pixels in a horizontal direction. The signal line is formed such that each signal line corresponds to one column of pixels in a direction perpendicular to the scan line. The scan line and signal line are connected to pixel electrode 22 and TFT element 23. The scan line, signal line, TFT element 23, and pixel electrode 22 are formed by conventional methods. In the present specification, the row direction is a direction parallel to the scan line, and the column direction is a direction parallel to the signal line. An insulation layer 6 and orientation layer 15 are formed on top of substrate 1a.

Color filters 20a–20c are formed on the other substrate 1b, and a dispersion type resist agent of various color can be used as a black matrix 21. Color filters 20a–20c and black matrix 21 may be formed by various methods, said color filters being formed with the filter parts of colors R, G, B comprising the color filters 20a–20c form stripes parallel to the signal line, and the R, G, B arrayed periodically in the scan line direction (direction parallel to the screen). The black matrix 21 may be formed as a lattice to circumscribe a single pixel. A flat layer 8 may be formed across the entire surface of substrate 1b on top of color filters 20a–20b. An ITO layer may be formed across the entire surface of substrate 1b as a transparent electrode via a spattering method. The orientation layer 15 is also formed.

The active matrix drive method, is applicable to the various liquid crystal elements shown in FIGS. 10–12.

FIGS. 14a–14d illustrate examples of the manufacturing method of the liquid crystal light modulation element.

First, as shown in FIG. 14a, a plurality of strip-shape electrodes 2a and 2b are formed as necessary on substrates 1a and 1b, as least one of said substrates being transparent. After an ITO later is uniformly formed on substrate 1a and 1b via a spattering method or the like, strip-shape electrodes 2a and 2b are formed by patterning via photolithography.

Then, a transparent insulation layer and orientation layer are formed on strip-shape transparent electrodes 2a and 2b as necessary. When the orientation layer is provided, a rubbing process may be used as necessary. The insulation layer and orientation layer may be formed by well known methods such as spattering, spin coating, or roll coating and the like using organic material such as polyimide resin or inorganic material such as silicon oxide and the like.

Resin structural nodule 3 is provided on at least one among substrates 1a and 1b provided with strip-shape transparent electrodes 2a and 2b (refer to FIG. 14b).

As shown in FIG. 15, resin structural nodule 3 may be formed by printing on substrate 1 installed on a plate-like support member 502 used as necessary by extruding resin material 30 via a squeegee 500 using screen 501 or metal mask or the like. As shown in FIG. 16, resin material mat be discharged from the tip of a nozzle 510 onto substrate 1 via a dispenser method or inkjet method. As shown in FIG. 17, resin material 30 may be supplied onto a flat substrate or roller 520, and subsequently transferred onto the surface of substrate 1.

It is desirable that the resin used to construct the resin structural nodule 3 via the aforesaid methods is a paste-like resin. A paste-like resin can be extruded in uniform shape from the tip of a nozzle or holes of a screen or the like to produce only slight dispersion of the shape of the resin structural nodule 3. Particularly when a plurality of resin structural nodules are formed by a printing method using a screen or metal mask or the like, a plurality of nodules can be formed on a substrate of large surface area with a short tact time, which is extremely efficient for mass production. In this instance, when the screen or metal mask is subjected to oil repellent processing beforehand, the adhesion of the resin material used to form the resin structural nodules to the screen or metal mask is suppressed, so as to limit the dispersion of the shape of the resin structural nodule.

The resin material used to form the resin structural nodule may include a volatile solvent. Examples of useful volatile solvent include aromatic solvents, aliphatic solvents, ether solvents, halogenated hydrocarbon solvents, ester solvents, and ketone solvents, which volatize within a range from room temperature to resin softening temperature when mixed in equal portions with the resin material. Specific examples of useful solvents include xylene, toluene, hexane, diethyl ether, dipropylene glycolmethyl ether, chloroform, butyl acetate, methylethyl ketone and the like. Inclusion of a volatile solvent allows the thermoplastic high molecular material to be formed in stripe-like shape, allows the resin structural nodule to be solidified by drying after forming the resin structural nodule 3, and reduces the deformation of the shape of the resin structural nodule 3 when subsequently overlaying substrates 1a and 1b.

The resin structural nodules may be formed by a printing method using a screen or metal mask or the like, or extrusion method of discharging resin from a nozzle of the like such as a dispenser method or inkjet method by using a method to solidify the material after the resin structural nodule has been arranged on a substrate using a paste-like resin. As a result, the amount of resin used is controlled to the minimum limit necessary, thereby keeping production costs low.

The resin material used to form the resin structural nodule 3 desirably has a viscosity of 100–1,000,000 cP at the temperature under which the resin material is arranged on the substrate. The viscosity can be measured by, for example, a E-type viscosity meter (Tokyo Keiki K.K.). Further to this, the resin material desirably has a thixotropicity of 1–100. Thixotropicity is a retaining degree of the resin structure nodules without loosening or settling its shape. In the present specification, viscosity was measured using a E-type viscosity meter (Tokyo Keiki K.K.) at 0.5–5 rpm; the value was calculated by determining the percentage viscosity.

If the viscosity of the resin material used to form the resin structural nodule is within a range of 100–1,000,000 cP at the temperature under which the material is applied to the surface of the substrate during printing, the resin structural nodule can be readily formed by a screen or metal mask printing method, or method of discharging resin from a nozzle via a dispenser method or inkjet method, so as to allow the resin structural nodule to retain the shape necessary to support both substrates through the liquid crystal layer. If the thixotropicity of the resin material used to form the resin structural nodule is within a range of 1–100 at the temperature under which said resin is applied to the surface of the substrate during printing, loosening of the formed resin structural nodule is reduced.

The height of the resin structural nodule during formation is desirably less than 5×, and more desirably less than 3×, the thickness of the desired liquid crystal light modulation layer. When the height of the resin structural nodule is greater than the thickness of the liquid crystal light modulation layer, the resin structural nodule better adheres to and supports both substrates, and when said nodule is less than 3× the thickness of the desired liquid crystal light modulation layer, the shifting and settling of the resin structural nodule is suppressed to a minimum limit when the substrates are overlaid.

As shown on the right side in FIG. 14b, spacer 4 is dispersed on at least one substrate among substrates 1a and 1b. The dispersion of spacer 4 may be accomplished by well known conventional dispersion methods, either wet methods or dry methods.

Spacer 4 may be arranged on at least one substrate among substrate 1a and 1b at the same time as resin structural nodule 3 by mixing within the resin material used to form the resin structural nodule 3 beforehand, as shown in FIG. 6. Mixing spacer 4 within the resin material and arranging the spacer 4 at the same time as the resin structural nodule 3 allows the spacer 4 to be arranged only within the resin structural nodule 3, so as to eliminate poor orientation of liquid crystal material 5 by spacer 4.

Mixing spacer 4 with the resin material used to form the resin structural nodule beforehand eliminates the process of distributing the spacer on the substrate, thereby not only improving production efficiency, but also suppressing display irregularities of the liquid crystal elements.

Of course, the spacer may be included in both the resin structural nodule and liquid crystal material, as shown in FIG. 7.

Then, as shown in FIG. 14c, the pair of substrates 1a and 1b are overlaid such that the surfaces on which a plurality of strip-shape electrodes are formed confront one another, and pressure and heat are applied from both sides of the pair of substrates 1a and 1b. Including a thermoplastic high molecular material in the resin material used to form the resin structural nodule allows the resin structural nodule to be softened by heating and again solidified by cooling, to adhere the resin structural nodule to both substrates.

Various pressure application methods may be used, e.g., pressure may be applied by sandwiching the substrates 1a and 1b between a pair of flat panels 601a and 601b and applying pressure via a pressure member 600 such as an air cylinder, as shown in FIG. 18. Another method of applying pressure is pass the pair of substrates 1a and 1b having resin structural nodules 3 sandwiched therebetween through a plurality of pairs of rollers 610 maintained at a desired spacing, as shown in FIG. 19. Another method of applying pressure is to take a pair of substrates 1a and 1b having structural nodule 3 sandwiched therebetween placed on a flat substrate 621 and pass said substrates between said substrate 621 and a top roller 620 which applies a load, as shown in FIG. 10. The pressure is desirably of a force within a range which does not move or deform or damage the spacer.

Various heating methods may be used, e.g., methods wherein the aforesaid heating process occurs within a heating chamber set at a desired temperature, and methods wherein the aforesaid flat panels 601a, 601b, 612, 621, and rollers 610 and 620 are heated to a desired temperature.

When pressure is applied to the substrate while the substrate is heated to a temperature above the softening temperature of the resin material of the resin structural nodule, the gap between the substrates can set at a value determined by the size of the spacer, and thereafter the substrate can be cooled while under pressure to a temperature below the softening temperature of the resin material so as to solidify the resin material while maintaining the gap between the substrates at a value determined by the size of the spacer. In this way deformation of the resin structural nodule is avoided when pressure is applied before cooling, and an increase in the gap between the substrates to a size greater than the value determined by the spacer is also avoided.

The substrates are cooled after the resin structural nodule 3 is softened and both substrates 1a and 1b are adhered. This cooling process may be natural cooling, or forced cooling of the substrate by cooling the interior of the heating chamber or flat panel 601a, 601b, 621, and rollers 610, 620. At this time, the substrate may be cooled by a suitably set percentage, but it is desirable that pressure continue to be applied while the substrate temperature is reduced to a temperature below the softening temperature of the resin material of the resin structural nodule 3. If pressure is discontinued while the resin material is above the softening temperature, the substrates may shift.

As shown in FIG. 14d, the liquid crystal material is injected into the cavity formed by the aforesaid process. Various well known vacuum injection methods may be used as the method to inject the liquid crystal material. The amount of liquid crystal material used can be the minimum limit necessary by injecting the liquid crystal material after the pair of substrates are adhered.

The substrates may be heated when the liquid crystal material is injected. Such heating increases the viscosity under room temperature conditions, so as to allow the liquid crystal material to be easily injected. At this time, the temperature of the substrate may be suitably set, but it is desirable that the set temperature is less than the softening temperature of the resin material of the resin structural nodule 3. When the substrate temperature is higher than the softening temperature of the resin material, there is concern that the resin material will melt into the liquid crystal material when the liquid crystal material is being injected, and the resin structural nodule may deform to running when the liquid crystal material 5 is injected.

The temperature of the substrate may be higher than the transition temperature to the isotropic phase of the liquid crystal material when the liquid crystal material has a high viscosity. Injecting the liquid crystal material in the isotropic phase allows easy injection due to the reduced viscosity, and reduces distribution of the liquid crystal component within the substrate during injection.

The stability of the orientation of the liquid crystal material is increased when using a softening temperature of the resin material forming the resin structural nodule which is higher than the isotropic phase transition temperature of the liquid crystal material. Even when the substrate is heated to a temperature higher than the isotropic phase transition temperature, softening of the resin structural nodule by said heat is prevented, so as to provide excellent support for both substrates.

Therefore, setting the substrate temperature during liquid crystal material injection at a temperature higher than the isotropic phase transition temperature of the liquid crystal and at a temperature below the softening temperature of the resin materials forming the resin structural nodule both improves flow characteristics and ease of injectability of the liquid crystal material, but also prevents the once adhered resin structural nodule from peeling from the substrate by the applied heat.

As shown in FIGS. 21a–21c, injection of the liquid crystal material also may be accomplished by dropping the material on the substrate prior to overlaying the pair of substrates. In this instance, the liquid crystal material is dripped on the entire surface of the plurality of strip-shape electrode surfaces of at least one substrate among said pair of substrates. In this example, a spacer 4 is included in the liquid crystal material 5 beforehand, and the mixture is dripped, as shown in FIG. 21c.

The dropping of the liquid crystal material 5 may be accomplished by ejecting said material 5 from a nozzle like aperture 700 of a syringe or the like onto substrate 1, as shown in FIG. 22. Another method is the roll coating method wherein liquid crystal material fed from a supply port 712 is supplied to a roll coater 710 via roller 713 so as to apply the liquid crystal material on a substrate 1 positioned on a panel support member 711, as shown in FIG. 23. Still another method is the bar coating method wherein liquid crystal material is uniformly applied by a bar coater 720 provided with a plurality of discharge nozzles 722, and a blade 721 formed of glass or rubber or the like disposed adjacent to and on the downstream side of said nozzle 722, as shown in FIGS. 24a and 24b.

The overlaying of the pair of substrates and injection of the liquid crystal material may be accomplished at the same time by dripping liquid crystal material onto the surface of at least one substrate prior to the overlaying of the pair of substrates. Although the injection time becomes longer as the substrate surface area increases so as to lengthen the tact time during production in conventional vacuum injection methods, the aforesaid method can greatly shorten injection time. It is possible to pre-mix the liquid crystal material and spacer beforehand using the liquid crystal drip method.

When dripping the liquid crystal material onto the substrate, the overlaying of the substrates may be accomplished by optional methods. When a hard substrate such as a glass substrate is used, a method to overlay the substrate from the edges may be used, as shown in FIG. 25.

On the other hand, when a film substrate is used, the liquid crystal material 5 may be loaded on the total area of the substrate by dripping liquid crystal material 5 on the center of substrate 1b and thereafter overlaying the pair of substrates 1a and 1b such that the strip-shape electrode surfaces of the pair of substrates 1a and 1b overlap in the center area, and applying pressure toward the edges of the pair of substrates 1a and 1b. In this way formation of air bubble in the liquid crystal material 5 is reduced when the substrates are overlaid. Liquid crystal adhered to the surface of the dropped resin structural material can be extracted by overlaying the substrates.

Since the viscosity of the liquid crystal material can be reduced by heating at least one substrate as previously described when injection the liquid crystal material via the drip method, there is less inclusion of air bubbles between the substrates when the substrates are overlaid. Furthermore, setting the temperature of the substrate at a temperature greater than the isotropic phase transition temperature of the liquid crystal material increases flowability of the liquid crystal material and reduces constituent change in the liquid crystal material at various positions on the substrate, thereby preventing display irregularities.

Production of air bubbles between the substrates of the element is reduced because the gas included in the liquid crystal material is removed under the reduced pressure when the substrates are overlaid.

Although FIGS. 21a–21c show examples of dripping liquid crystal material onto only one substrate, liquid crystal material may be dripped onto the entire surface of one substrate to assure the prevention of trapped air bubbles, and also dripping liquid crystal material in dot-like array on the other substrate. In this instance, the areas of liquid crystal material adhered in dot-like pattern may be overlaid on the other substrate.

After dripping the liquid crystal material, excess liquid crystal material is removed, and the pair of substrates are overlaid.

Seal 7 shown in FIGS. 8 and 9 may be provided at an optional time using a suitable resin material or the like. For example, using an ultraviolet-curing resin or thermosetting resin, a seal may be provided on the exterior edge of at least one substrate among a pair of substrates 1a and 1b before said pair of substrates 1a and 1b are overlaid. The width of this seal is desirably in the range of 10–1,000 µm.

As shown in FIGS. 27a–27c, it is desirable that seal 7 is provided beforehand with an opening 13 at a specific injection location as an inlet/outlet for liquid crystal material 5 when injecting extracting liquid crystal material. This injection inlet 13 may be sealed by a sealing agent 14 such as ultraviolet-curing resin or the like after liquid crystal material 5 is loaded.

Seal 7 may be formed of the same material as used for the resin structural nodule. That is, the same material as used for the resin structural nodule may be continued on the exterior edge of the liquid crystal light modulation layer so as to form a wall like resin structure circumscribing the exterior periphery of the liquid crystal light modulation element. In this way the wall-like resin structure functions as a seal 7 for the liquid crystal light modulation element. The wall-like resin structure forming seal 7 is formed outside the light modulation region of the strip-shape electrode surface on at least one substrate using the same method as that to form the aforesaid resin structural nodule. Specifically, the seal 7 may be formed by methods wherein resin is discharged from a nozzle onto a substrate such as a dispenser method or inkjet method or the like, printing method using a screen or metal mask or the like, or transfer method for supplying resin onto a flat panel or roller and subsequently transferring said resin to a substrate.

Wall-like resin structure 7 may be formed by the same method as resin structural nodule 3, or by a different method. Wall-like resin structure 7 may be provided on the same substrate as resin structural nodule 3, or may be provided on a different substrate. Wall-like resin structure 7 may be one the same substrate at the same time as resin structural nodule 3 to simplify the manufacturing process.

Both substrates can be supported over a wide area by forming the wall-like resin structure 7 outside the light modulation region. Therefore, the gap between substrates can be uniformly maintained over the entire element, and display quality is improved.

The formation of the wall-like resin structure 7 can be accomplished at the same time as the formation of the dot-like or stripe-like resin structural nodule provided within the liquid crystal light modulation region, thereby using a minimum of production processes and greatly improving production efficiency.

In the method for forming the wall-like resin structure 7 by discharging reisn through a nozzle onto a substrate via a dispenser method or inkjet method or the like, the drawing pattern may be controlled so as to only draw the wall-like resin structure 7. In the case of a printing method using a screen or metal mask or the like, as shown in exemplary FIG. 28, a screen or metal mask or the like a wall-like having both a resin structure pattern 503 and resin structural nodule pattern 504 may be used. In this instance, as shown in FIG. 29, the resin structural nodule 3 and seal 7 may be formed on substrate 1 at the same time. In the transfer method wherein resin is supplied to a roller, then transferred onto a substrate, the transfer pattern may be changed to match the shape of the wall-like resin structure.

When wall-like resin structure 7 and resin structural nodule 3 are provided on different substrates, the method of forming the resin structure outside the light modulation region can be easily changed. For example, a fine resin structure may be produced within the light modulation region using a screen or metal mask, and a resin structure may be formed outside the light modulation region using a dispenser to reduce the amount of resin consumed to a necessary minimum limit. Furthermore, the resin materials used to form the resin structure inside and outside the light modulation area may be different. For example, a resin having the important fineness and adhesion qualities may be selected as the material within the light modulation region, and a resin material having high air-tightness and long-term reliability may be selected as the material outside the light modulation region so as to prevent contamination of the liquid crystal material within the light modulation region by impurities from outside said region. It is desirable that a thermosetting resin such as epoxy resin is used as the resin material outside the light modulation region to prevent contamination of the liquid crystal material within the light modulation region by impurities from the outside. Since thermosetting resins are not readily affected by heat after being baked once, they can maintain air-tightness over a long term.

It is desirable that the softening temperature of the resin material forming the resin structural nodules within the light modulation region matches or is near the hardening temperature of the thermosetting resin. In this instance, processing of both resins can be accomplished in a single heating process, thereby greatly improving production efficiency. It is desirable that the absolute value of the difference between the softening temperature of the resin material and the hardening temperature of the thermosetting resin is 15° C., and more desirably about 10° C.

The wall-like resin structure 7 provided outside the light modulation region may have a multilayer structure of two layers, three layers and the like, as shown in FIG. 30. Both substrates are supported over a wide area by using a multilayer structure of the resin structure 7 outside the light modulation region, thereby providing stronger support of the substrates. Since the air-tightness seal of the element is improved, there is a marked reduction in intrusion of moisture and impurities from outside the element, thereby improving the reliability of the liquid crystal element.

All resin structures may have a multilayer structure and be formed on the same substrate, or may be formed on different substrates. The processes can be simplified if all resin structures are formed on the same substrate, whereas if formed on different substrates, the manufacturing method and resin material may differ between the resin structures having multilayer structures. Furthermore, the material of each resin structure forming a multilayer structure may be the same or different. For example, among the resin structures forming multilayer structures, the first structure on the interior side may be a resin material selected to not influence the orientation of the liquid crystal material since it is a resin structure that comes in contact with the liquid crystal material, and a resin material suited for assuring the airtightness of the element may be selected for the other resin structures.

Part of the wall-like resin structure provided outside the light modulation region may be provided with an opening as necessary. This opening may be used as an injection inlet when injecting liquid crystal material after adhering the pair of substrates, or may be used as discharge outlet for liquid crystal material when dripping liquid crystal material on a substrate before adhering said pair of substrates. The injection inlet may be sealed using an ultraviolet-curing resin after the liquid crystal material is loaded.

Second Embodiment

Although the first embodiment described an example of a liquid crystal light modulation element having electrodes within the element itself, it is not necessary for the liquid crystal light modulation element itself to be provided with electrodes. For example, when a liquid crystal with memory characteristics is used, the action of an electric field may be used to switch between at least two states wherein said liquid crystal has different transmittance or reflectivity of visible light for a display. This embodiment is described by way of an example providing electrodes on the exterior of the liquid crystal element to supply a voltage to the liquid crystal light modulation layer.

FIG. 32 is a section view of liquid crystal display sheet 200 of one embodiment of the present invention. As shown in FIG. 32, liquid crystal display sheet 200 comprises sequential layers of a transparent substrate 1a, liquid crystal light modulation layer 10 for displaying specific colors, and transparent substrate 1b. A pair of electrodes 81 and 82 are arranged on the front and back surfaces of liquid crystal display sheet 200 and connected to power source 80, so as to display by changing the orientation of the liquid crystal molecules via the application of a voltage to liquid crystal display sheet 200, as shown in FIG. 32.

FIG. 33 shows an example of the construction for achieving a display in liquid crystal display sheet 200. As shown in FIG. 33, the system is provided with transport rollers 90 and 91, electrode 83 divided into a plurality and arranged in the width direction of liquid crystal display sheet 200, and a power source 80 connected to electrode 83.

An image is drawn on liquid crystal display sheet 200 by individually turning ON/OFF the electrodes 83 based on image information as the display sheet is transported at uniform speed via transport rollers 90 and 91. An image on the sheet can be erased by supplying a uniform voltage to electrode 83.

FIG. 34 shows the construction of another example for supplying a voltage. As show in FIG. 34, a desired image is drawn on liquid crystal display sheet 200 by tracing on liquid crystal display sheet 200 with a pen-type electrode 84 connected to power source 80.

The invention is described in detail by way of specific examples below.

EXAMPLE 1

Two No. 7079 GLASS (available from Corning) measuring 127×127 mm were used as substrates and a thin ITO layer 700 Å in thickness was applied to said substrates via a spattering method. Then, strip-shape transparent electrodes having a width of 280 $\mu$m and spaced at 20 $\mu$m intervals were formed on said substrates via photolithography. An insulation layer of silicon oxide 4,000 Å in thickness was then formed on the transparent electrode via a spattering method. Next, an orientation material SE-610 (available from Nissan Kagaku Kogyou K.K.) was applied to a thickness of 500 Å via a spin coating method, and heated for 1 hr at 180° C. in a heating chamber to form an orientation layer on said insulation layer. The orientation layer on each substrate was subjected to a rubbing process using a nylon cloth to achieve a rubbing angle of 260° when the two substrates were opposed.

Then, a paste-like thermoplastic polyester resin material ARONMELT PES-360SA40 (softening temperature: 150° C.; viscosity: 4500 cps at 25° C.; thixotropicity: 3.2 at 25° C.; available from Three bond K.K.) was applied to one substrate via a screen printing device model MS400 (available from Murakami K.K.) suing a metal mask 35 $\mu$m in thickness and provided with round resin through-holes 40 $\mu$m in diameter and at a pitch of 300 $\mu$m in the area corresponding to the light modulation region of the element. The substrate temperature at this time was maintained at 25° C., and resin material was arranged to match the four corner positions pixel 9, i.e., in a lattice configuration as show in FIG. 8.

The aforesaid substrate was heated on a hotplate for 20 min at 80° C. to volatize the mixed solvents of toluene and methylethylketone contained in the resin material and solidify the resin material. In this way resin structural nodules having a diameter of 40 $\mu$m and height of 10 $\mu$m were formed on the substrate at a pitch of 300 $\mu$m. In the present example, the ratio of the resin structural nodule to the substrate gap was about 1.67 to achieve a substrate gap of 6 $\mu$m.

Next, liquid crystal material was dripped on the substrate. The liquid crystal material used comprised 2.3 wt % chiral material S-811 (available form Merck) added to STN liquid crystal MLC6068-000 (transition temperature: 70° C.; available form Merck). Spacers approximately 6$\mu$ in particle size (MICROPEARL SP-206; available form Sekisui Fine Chemicals K.K.) were dispersed in the aforesaid liquid crystal material beforehand, and dropped onto the substrate bearing the resin structural nodules using a syringe so as to cover the entire surface within the light modulation region circumscribed by a seal produced in a later process. When the liquid crystal material was dropped onto the substrate, the substrate was heated to 75° C. on a hotplate. The liquid crystal material was in a state of equilibrium (isotropic phase) at this time.

A mixture of spacers approximately 6 $\mu$m in particle size (MICROPEARL SP-206; available form Sekisui Fine Chemicals K.K.) were dispersed in sealant STRUCTBOND XN-21-S (Mitsui Toatsu Chemical, Ltd.) was applied to the peripheral edges of the other substrate using a liquid crystal sealant applicator model MLC-III (Musashi Engineering, Ltd.) as an dispenser. An opening for removal of the liquid crystal material was provided at this time.

The substrate bearing the resin structural nodules and the substrate bearing the seal were overlaid with the ribbon-like electrode surfaces confronting each other. At this time, the ribbon-like electrodes of each substrate was overlaid so as to be mutually perpendicular. Then the overlaid substrates were gripped two surface-ground stainless panels, and adhered one to another by applying a load of about 0.37 kg/cm$^2$ to said panels, and allowing the substrates to stand for 60 min at 160° C. inside a heating chamber. In the present example, the heating process for adhesion is accomplished in a single step because the softening temperature of the resin material forming the resin structural nodules within the light modulation region and the hardening temperature of the resin material forming the resin structure outside the light modulation region are very near one another.

Thereafter, power to the heating chamber was stopped, and the substrates were allowed to cool to room temperature while the load was maintained. After cooling, an ultraviolet-curing resin PHOTOREK A-704-60 (Sekisui fine Chemicals. K.K.) was applied to the liquid crystal discharge opening of the aforesaid seal, and exposed to ultraviolet light to complete the seal.

The gap between the substrates of the STN liquid crystal panel produced in the aforesaid manner was measured using a liquid crystal gap measuring device model RETS-2000 (Otsuka Denshi K.K.); measurement results are shown in FIG. 31. The liquid crystal panel had an extremely uniform gap between substrates, as shown in FIG. 31. When the voltage transmission characteristics were measured at 9 optional points on the liquid crystal panel, it was clear the display was uniform with reduced display irregularities at said positions. Furthermore, it was found that the gap between substrates did not change after the liquid crystal panel was stored for 1 hr under high temperature conditions of 100° C.

EXAMPLE 2

Two No. 7059 GLASS (available from Corning) measuring 550×650 mm were used as substrates, scan line, signal line, pixel electrode, and TFT elements were formed on one of said substrates. The pixel electrode was provided for each pixel arranged in a matrix. The scan line was formed for each row of pixels in a horizontal direction in the display plane of the liquid crystal panel. The signal line was formed for each column of pixels in a direction perpendicular to the scan line. The scan line and signal line and pixel electrode were connected via the TFT element. In the present example, the material forming each layer was used to form a thin layer via a spattering method, and finished to a predetermined shape via photolithography. The pixel electrode was 200 μm in width and 600 μm in length.

Then, an orientation layer was formed over the entire surface of the glass substrate provided with the TFT element. The orientation layer was printed on the entire surface of one electrode via a thin layer printing device model A-65A (available from Nakan Co.) using orientation material AL4552 (Japan Synthetic Rubber Co., Ltd.) having polyimide as the main constituent. Thereafter, the substrate was heated for 1 hr in a heating chamber set at 200° C. to form an orientation layer 400 Å in thickness. The TFT side of the substrate was formed in this manner.

A color filter and black matrix for blocking light to the TFT element formed on the aforesaid glass substrate were formed on the other substrate via photolithography. The color filter and black matrix were respectively formed using color resist PD-200 (RGB; Hitachi Chemical Co., Ltd.) of the pigment dispersion type, and PD-170K (black matrix; Hitachi Chemical Co., Ltd.). The color filter and black matrix may be formed by various methods. In the present example, the color filter area of each color R, G, B comprising the color filter is formed as a stripe parallel to the signal line, and arranged in R, G, B periodicity in the scan line direction (direction horizontal to the image plane). The black matrix is formed as a lattice circumscribing a single pixel.

Next, a flat layer was formed on the entire surface of the substrate over the color filter. Formation of the flat layer was accomplished by applying AC-8100 (available from Nissan Chemical K.K.) using a layer printing device model A65A (available from Nakan Co.) and baking at 220° C. Then, an ITO layer was formed over the entire surface of the substrate to a thickness of 700 Å via a spattering method as a transparent electrode, on this layer was formed an orientation layer identical to the one described above. The opposite substrate was formed in this manner.

A rubbing process was performed on the TFT substrate and the opposite substrate. Then, resin structural nodules were formed. In the example, three pixels are designated as a single pixel, a metal mask (murakami K.K.) 25 μm in thickness and having circular resin through-holes 40 μm in diameter and a pitch of 600 μm was used for printing the resin structural nodules via a large printing device model FZ-36-1020 (Murakami K.K.). The substrate temperature was maintained at about 25° C. during printing. A mixture of spacers approximately 4.5 μm in particle size (MICROPEARL SP-2045; Sekisui Fine Chemical, Ltd.) dispersed beforehand in thermoplastic resin STAYSTICK 371 (viscosity: 250,000 cP; thixotropicity: 1.7; available from Techno Alpha Co.) was used. Resin structural nodules 40 μm in diameter and 6 μm in height were formed at a pitch of 600 μm. The ratio of the height of the resin structural nodule to the substrate gap was about 1.33.

Then, the substrates were adhered via the resin structural nodules, and 0.7 wt % chiral material S-811 (available from Merck) added to TN type liquid crystal ZLI1565 (available from Merck) was vacuum injected between the substrates, and the liquid crystal injection opening of the seal was sealed using ultraviolet-curing resin similar to example 1 to form the liquid crystal light modulation layer.

A TFT driven liquid crystal display panel having a 4.5 μm substrate gap and the construction shown in FIG. 13 was thus produced. The obtained TFT liquid crystal panel used a large substrate, maintained a uniform cell gap, an included spacers only in the resin structural nodules so as to provide a liquid crystal panel having an extremely high quality display without bright spots caused by spacer flocculation.

EXAMPLE 3

An STN type liquid crystal panel was produced in the same manner as example 1 with the exception that the resin structural nodules were formed by a screen printing method. An a screen model MS-ER plate MS-290B (Murakami K.K.) subjected to oil-repellent processing was used; resin through hole size was 50 μm, pitch 200 μm, emulsion thickness was 35 μm.

The produced liquid crystal display panel had an excellent display similar to that of example 1 with resin structural nodules 50 μm in size and 8 μm in height at a pitch of 200 μm. Since the screen was subjected to oil repellent processing, the screen did not become clogged even after repeated printings of the resin material, thereby providing excellent operating efficiency.

EXAMPLE 4

An STN type liquid crystal display panel was produced in the same manner as example 1 with the exception that the resin structural nodules were formed using a dispenser. The dispenser was an ultra fine discharge device model SMP-III (Musashi Engineering, Ltd.) with a tip nozzle bore of 100 μm, and discharge capacity of $10^{-6}$ cc. This device produced resin structural nodules 120 μm in size and 18 μm in height at a pitch of 300 μm. The ratio of the height of the resin structural nodule to the substrate gap was 3.

The liquid crystal panel thus produced provided a high quality display an uniform cell gap.

EXAMPLE 5

An STN type liquid crystal panel provided with a wall-like resin structure outside the light modulation region was produced in the same manner as example 1 with the exception that resin material was provided on one substrate using metal mask and a screen printing device model MS400 (Murakami K.K.) while maintaining the substrate temperature at 25° C. The metal mask used had a pattern of resin through holes 40 μm in diameter at a pitch of 300 μm in an area corresponding to the light modulation region, and a frame-like pattern having an opening for liquid crystal discharge with a line thickness of 400 μm in the area outside the light modulation region; the mask has a thickness of 35 μm.

The liquid crystal panel produced by this method had a high quality display with uniform cell gap. In the present example, the seal of the liquid crystal panel and the resin structure within the light modulation region may be formed simultaneously, thereby producing a liquid crystal panel with extremely high efficiency.

EXAMPLE 6

An STN type liquid crystal panel was produced in the same manner as example 5 with the exception that the mask used had a pattern of resin through holes 40 μm in diameter at a pitch of 300 μm in an area corresponding to the light modulation region, and a double frame-like pattern having an opening for liquid crystal discharge with a line thickness of 400 μm in the area outside the light modulation region; the mask has a thickness of 35 μm.

The liquid crystal panel produced by this method had a high quality display with uniform cell gap. In the present example, the seal of the liquid crystal panel and the resin structure within the light modulation region may be formed simultaneously, thereby producing a liquid crystal panel with extremely high efficiency. Further to this, the substrates are tightly secured inasmuch as the seal of the liquid crystal panel has multilayer structure.

EXAMPLE 7

First, resin structural nodules were formed on one substrate in the same manner as example 1. A resin structure was formed on the peripheral edge of the other substrate using a mixture of MICROPEARL SP 206 spacers 6 μm in size dispersed in a thermoplastic resin 371 (viscosity: 250,000; thixotropicity: 1.7; abailable from Techno Alpha Co.) via a screen printing method. The screen used was an MS-ER plate MS-290 oil repellent type (Murakami K.K.). The screen had a frame-like pattern of 400 μm line thickness with a liquid crystal outlet outside the light modulation region, and emulsion thickness was 70 μm.

After the substrates were overlaid with the strip-like electrode surfaces confronting one another, they were heated to 150° C. under pressure to adhere the substrates. Liquid crystal material was then injected in the same manner as example 1, and the opening was sealed to form a liquid crystal light modulation element.

The liquid crystal panel thus produced had a high display quality and uniform cell gap. The liquid crystal panel was also produced with extremely high efficiency similar to example 5.

EXAMPLE 8

A pair of polycarbonate substrates with attached ITO electrodes (available from Fujimori Kogyou) were used as substrates, and strip-like electrodes having a width of 280 μm and spaced at 20 μm intervals were formed via a photolithography process on the substrates. Orientation material AL4552 (Japan Synthetic Rubber Co., Ltd.) was used to print over the entire surface of the substrate via a thin film printing device model A-65A (available from Nakan Co.), and the substrates were heated at 120° C. for 1 hr in a heating chamber to form the orientation layer 400 Å in thickness. After the orientation layer was formed, a rubbing process was performed with a rubbing angle of 260° C.

Then, liquid crystal material was dropped using a dropper to traverse the center on the substrate bearing the resin structural nodules. Thereafter, the opposite substrate was supported in a direction perpendicular to the strip-like electrode, and substrates 1a and 1b were brought into contact in a U-shaped configuration with the dropped liquid crystal material on top. Bilateral edges of the opposite substrate in a U-shape were pulled slowly to overlay the other substrate from the center area. Both substrates were overlaid edge to edge, and adhered by heating and pressure. At this time, excess liquid crystal material was removed through the opening. Subsequently, the liquid crystal panel was produced in the same sequence as example 1.

The liquid crystal panel thus obtained had a high display quality and uniform cell gap. No air bubble were observed between the substrates.

EXAMPLE 9

A liquid crystal panel was produced in the same way as example 1 with the exception that after the liquid crystal material was dropped on the substrate, the substrates were overlaid in a vacuum chamber. When overlaying the substrates, the pressure in the vacuum chamber was gradually reduced to remove air bubbles from the liquid crystal material. The substrates were then adhered by heating under pressure, then cooled under pressure. Thereafter, the liquid crystal panel was produced in the same manner as example 1.

There were no air bubbles within the liquid crystal panel thus produced, and air bubbles were not generated in display pixels even after heating and cooling experiments over a total of 100 hrs at low temperatures of −25° C. and high temperature of 70° C. The panel thus produced had high display qualities and uniform cell gap.

Reference Example 1

After forming the orientation layer in the same manner as example 1, spacer 6 μm in size (MICROPEARL SP 206; available from Sekisui Fine Chemicals, Ltd.) which are not heat deformable and a thermoplastic polyester resin AROM-MELT PES-360SA40 (available from Three Bond K.K.) with 100 μm particle size are dispersed on substrate using a dry type dispersion method. Dispersion density was about 100 particles/mm$^2$, respectively. Thereafter, an opening was provided in part of the periphery of the substrate, and a seal was formed using STRUCTBOND XN-21-S (Mitsui Toatsu Chemical Co., Ltd.), then the two substrates were adhered. Next, 2.3 wt % chiral material S-811 (Merck) added to STN liquid crystal MLC6068-000 was injected using a well known vacuum injection method. After injection, the opening was sealed using ultraviolet-curing resin PHOTOREK A-704-60 (available from Sekisui Fine Chemicals, Ltd.).

Microscopic examination of the cells produced in this manner revealed flocculation of the thermoplastic polyester resin, and poor orientation of the liquid crystal material. Many bright spots were observed in the panel, and the display was average.

EXAMPLE 10

Using a thermoplastic polyester resin PES-360S30 (softening temperature: 150° C.; available from Three Bond K.K.), columnar resin structural nodules about 40 μm in diameter and pitch of 300 μm were formed via a screen printing method on a glass substrate with attached ITO patterned electrodes having a rubbed polyimide orientation layer formed thereon. A continuous resin dam with a liquid crystal injection opening was formed using the aforesaid polyester resin on the exterior edge of the substrate at the same time as the resin structural nodules were formed.

Then, spacers approximately 4.5 μm in size (MICROPEARL SP-2045; available from Sekisui fine Chemicals, Ltd.) were dispersed over the entire substrate surface to a uniform density of about 150/mm$^2$ via a dry dispersion method. The opposite substrate was similarly a glass substrate provided with ITO electrodes having a rubbed polyimide orientation layer formed on the surface thereof, and both substrates were overlaid with said electrode surfaces confronting one another at a twist of 90°, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to form the cell.

A liquid crystal material comprising 0.7 wt % chiral material S-811 (available from Merck) added to nematic liquid crystal ZLI-1565 (TN-I=85° C.; available from Merck) was heated to 90° C., then vacuum injected, and the opening was sealed using an ultraviolet-curing resin PHO-TOREK A-704-60 (available from Sekisui Fine Chemicals, Ltd.), polarization panels was added to the top and bottom exterior surfaces of the cell by cross-Nicol arrangement to obtain the TN type liquid crystal light modulation element shown in FIG. 10. TN-I expresses the phase transition from the liquid crystal phase to the isotropic phase in elevated temperature processes.

A force of 10 kg/cm$^2$ was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 11

A TFT type liquid crystal panel was produced in the same manner as example 1 with the exception that an active matrix type cell formed by thin layer transistors connected to a plurality of pixel electrodes was formed on the interior surface of one substrate. This liquid crystal panel had high contrast with minimal crosstalk. No changes were observed when external pressure was applied.

EXAMPLE 12

Using a thermoplastic polyester resin PES-360S30 (available from Three Bond K.K.), columnar resin structural nodules about 40 μm in diameter and pitch of 300 μm were formed via a screen printing method on a glass substrate with attached ITO patterned electrodes having a rubbed polyimide orientation layer formed thereon. A continuous resin dam with a liquid crystal injection opening was formed using the aforesaid polyester resin on the exterior edge of the substrate at the same time as the resin structural nodules were formed.

Then, spacers approximately 6.5 μm in size (MICROPEARL SP-2045; available from Sekisui fine Chemicals, Ltd.) were dispersed over the entire substrate surface to a uniform density of about 150/mm$^2$ via a dry dispersion method.

The opposite substrate was similarly a glass substrate provided with ITO electrodes having a rubbed polyimide orientation layer formed on the surface thereof, and both substrates were overlaid with said electrode surfaces confronting one another at a twist of 250°, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to form the cell.

A liquid crystal material comprising 2.3 wt % chiral material S-811 (available from Merck) added to nematic liquid crystal MLC6068-000 (TN-I=70° C.; available from Merck) was heated to 80° C., then vacuum injected, and the opening was sealed using an ultraviolet-curing resin PHO-TOREK A-704-60 (available from Sekisui Fine Chemicals, Ltd.), a polarization panel and phase difference panel were added to the top and bottom exterior surfaces of the cell to achieve the greatest contrast ration to obtain the TN type liquid crystal light modulation element shown in FIG. 11 .

A force of 10 kg/cm$^2$ was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 13

Using a thermoplastic polyester resin PES-360S30 (available from Three Bond K.K.), columnar resin structural nodules about 40 μm in diameter and pitch of 300 μm were formed via a screen printing method on a glass substrate with attached ITO patterned electrodes having a rubbed polyimide orientation layer formed thereon. A continuous resin dam with a liquid crystal injection opening was formed using the aforesaid polyester resin on the exterior edge of the substrate at the same time as the resin structural nodules were formed. Then, spacers approximately 1.5 μm in size (MICROPEARL SP-2045; available from Sekisui fine Chemicals, Ltd.) were dispersed over the entire substrate surface to a uniform density of about 200/mm$^2$ via a dry dispersion method.

The opposite substrate was similarly a glass substrate provided with ITO electrodes having a rubbed polyimide orientation layer formed on the surface thereof, and both substrates were overlaid with said electrode surfaces confronting one another, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to form the cell.

A liquid crystal material comprising smectic liquid crystal CS-1016 (TN-I=72.5° C.; available from Tisso Kagaku K.K.) was heated to 80° C., then vacuum injected, and the opening was sealed using an ultraviolet-curing resin PHO-TOREK A-704-60 (available from Sekisui Fine Chemicals, Ltd.), a polarization panel was added to the top and bottom exterior surfaces of the cell to obtain the ferrodielectric liquid crystal light modulation element shown in FIG. 10.

A force of 10 kg/cm$^2$ was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 14

Using a thermoplastic polyester resin PES-360S30 (available from Three Bond K.K.), columnar resin structural nodules about 40 μm in diameter and pitch of 300 μm were formed via a screen printing method on a glass substrate (10×10 cm) with attached ITO patterned electrodes having a rubbed polyimide orientation layer formed thereon. A continuous resin dam with a liquid crystal injection opening was formed using the aforesaid polyester resin on the exterior edge of the substrate at the same time as the resin structural nodules were formed. Then, spacers approximately 10 μm in size (MICROPEARL SP-210; available from Sekisui fine Chemicals, Ltd.) were dispersed over the entire substrate surface to a uniform density of about 100/mm$^2$ via a dry dispersion method.

The opposite substrate was similarly a glass substrate provided with ITO electrodes having a lapped polyimide orientation layer formed on the surface thereof, and both substrates were overlaid with said electrode surfaces confronting one another, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to form the cell.

A liquid crystal material comprising 10.0 wt % chiral material S-811 (available from Merck) added to nematic liquid crystal E-48 (TN-I=87° C.; available from Merck) was heated to 90° C., then vacuum injected, and the opening was sealed using an ultraviolet-curing resin PHOTOREK A-704-60 (Sekisui Fine Chemicals, Ltd.), a polarization panel was added to the top and bottom exterior surfaces of the cell to obtain the cholesteric-nematic phase transition type liquid crystal light modulation element shown in FIG. 12.

A force of 10 kg/cm$^2$ was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 15

Using a thermoplastic polyester resin PES-360S30 (available from Three Bond K.K.), columnar resin structural nodules about 40 μm in diameter and pitch of 300 μm were formed via a screen printing method on a glass substrate (10×10 cm) with attached ITO patterned electrodes having a silicon oxide insulation layer formed thereon. A continuous resin dam with a liquid crystal injection opening was formed using the aforesaid polyester resin on the exterior edge of the substrate at the same time as the resin structural nodules were formed. Then, spacers approximately 7.5 μm in size (MICROPEARL SP-2075; available from Sekisui fine Chemicals, Ltd.) were dispersed over the entire substrate surface to a uniform density of about 100/mm$^2$ via a dry dispersion method.

The opposite substrate was similarly a glass substrate provided with ITO patterned electrodes having an insulation layer formed on the surface thereof, and both substrates were overlaid, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to form the cell.

A liquid crystal material comprising 24.5 wt % chiral material S-811 (available from Merck) added to nematic liquid crystal E-31LV (TN-I=61.5° C.; available from Merck) was heated to 60° C., then vacuum injected. The opening was sealed using an ultraviolet-curing resin PHOTOREK A-704-60 (available from Sekisui Fine Chemicals, Ltd.) to obtain the cholesteric liquid crystal light modulation element shown in FIG. 12 expressing a selective reflecting wavelength of green color at 550 nm.

A force of 10 kg/cm$^2$ was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

Reference Examples 2

Each of the liquid crystal light modulation elements of the previously mentioned examples was produced using identical substrate materials, liquid crystal material and spacer materials and identical conditions described in Examples 1–5, but the resin structural nodules were omitted, and liquid crystal was injected and sealed using sealant XN-21-S (available from Mitsui Toatsu Chemicals, Ltd.) as a seal on the exterior edge of the element, and heating and hardening the sealant at 180° C. for 90 min.

EXAMPLE 16

Using a thermoplastic polyester resin PES-360S30 (available from Three Bond K.K.), columnar resin structural nodules about 40 μm in diameter and pitch of 300 μm were formed via a screen printing method on a glass substrate (30 cm$^2$) with attached ITO patterned electrodes having a lapped polyimide orientation layer formed thereon. Spacers approximately 1.5 μm in size (MICROPEARL SP-2015; Sekisui fine Chemicals, Ltd.) were added to the resin beforehand at 1.5 wt %, to form resin structural nodules containing said spacers on the substrate. A continuous resin dam of the same polyester resin was formed on the exterior edge of the substrate at the same time as the resin structural nodules.

The opposite substrate was similarly a glass substrate provided with ITO patterned electrodes having a rubbed polyimide orientation layer formed on the surface thereof, and both substrates were overlaid with said electrode surfaces confronting one another, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to form the cell.

A liquid crystal material comprising smectic liquid crystal CS-1016 (available from Tisso Kagaku K.K.) was heated to 80° C., then vacuum injected, and the opening was sealed using an ultraviolet-curing resin PHOTOREK A 704-60 (available from Sekisui Fine Chemicals, Ltd.), a polarization panel was added to the top and bottom exterior surfaces of the cell to obtain the ferrodielectric type liquid crystal light modulation element shown in FIG. 10.

A force of 10 kg/cm$^2$ was applied as external pressure to the aforesaid liquid crystal light modulation element, but no expansion or contraction of the spacing between substrates was observed after the external pressure was removed, and irregularities noted during spacer distribution were also eliminated. There were likewise no changes in the drive voltage observed before or after external pressure application. No air bubbles were observed after this liquid crystal light modulation element was stored for 24 hr at −25° C.

EXAMPLE 17

Using a thermoplastic polyester resin PES-360S30 (available from Three Bond K.K.), columnar resin structural nodules about 40 μm in diameter and pitch of 300 μm were formed via a screen printing method on a glass substrate (10×10 cm) with attached ITO patterned electrodes having a rubbed polyimide orientation layer formed thereon. A continuous resin dam with a liquid crystal injection opening was formed using the aforesaid polyester resin on the exterior edge of the substrate at the same time as the resin structural nodules were formed. Then, spacers approximately 6.5 μm in size (MICROPEARL SP-2065; available from Sekisui fine Chemicals, Ltd.) were dispersed over the entire substrate surface to a uniform density of about 100/mm² via a dry dispersion method. Thereafter, a liquid crystal material comprising 2.3 wt % chiral material S-811 (available from Merck) added to nematic liquid crystal MLC6068-000 (available from Merck) dropped via a liquid discharging device (dispenser) onto a substrate heated to 80° C. a temperature exceeding the equilibrium transition temperature (70° C.) of the chiral nematic liquid crystal so as to not overlay the resin structural nodules.

The opposite substrate was similarly a glass substrate provided with ITO electrodes having a rubbed polyimide orientation layer formed on the surface thereof, and both substrates were overlaid with said electrode surfaces confronting one another at a twist angle of 250° in a vacuum, then the substrates were heated to the softening temperature of the polyester resin, i.e., 150° C., and pressure of 0.2 kg/cm² was applied thereto for 5 min, after which the substrates were cooled to room temperature while maintaining the pressure application to form the cell.

A polarization panel and phase difference panel were added to the top and bottom of the cell for maximum contrast and produce the STN type liquid crystal light modulation element shown in FIG. 11. A force of 10 kg/cm² was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 18

Using a thermoplastic polyester resin PES-360S30 (available from Three Bond K.K.), columnar resin structural nodules about 40 μm in diameter and pitch of 150 μm were formed via a screen printing method on a glass substrate (10×10 cm) with attached ITO patterned electrodes having a lapped polyimide orientation layer formed thereon. A continuous resin dam with a liquid crystal injection opening was formed using the aforesaid polyester resin on the exterior edge of the substrate at the same time as the resin structural nodules were formed. Then, spacers approximately 6.5 μm in size (MICROPEARL SP-2065; available from Sekisui fine Chemicals, Ltd.) were dispersed over the entire substrate surface to a uniform density of about 200/mm² via a dry dispersion method.

The opposite substrate was a polycarbonate substrate (available from Fujimori Industries, Ltd.) provided with ITO electrodes having a rubbed polyimide orientation layer formed on the surface thereof, and both substrates were overlaid with said electrode surfaces confronting one another at a twist angle of 250° in a vacuum, then the substrates were heated to the softening temperature of the polyester resin, i.e., 130° C., and pressure of 0.2 kg/cm² was applied thereto for 5 min, after which the substrates were cooled to room temperature while maintaining the pressure application to form the cell.

A liquid crystal material comprising 2.3 wt % chiral material S-811 (available from Merck) added to nematic liquid crystal MLC-6-68-000 (TN-I: 70° C.; available from Merck) was heated to 80° C., and then vacuum injected into the cell, and the opening was sealed using an ultraviolet-curing resin PHOTOREK A-704-60 (available from Sekisui Fine Chemicals, Ltd.), and finally a polarization panel and phase difference panel were added to the top and bottom of the cell for maximum contrast to produce the STN type liquid crystal light modulation element shown in FIG. 11.

The obtained element was lighter in weight than the elements using two glass substrates. A force of 10 kg/cm² was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 19

Using a thermoplastic polyester resin PES-360S30 (available from Three Bond K.K.), columnar resin structural nodules about 40 μm in diameter and pitch of 150 μm were formed via a screen printing method on a polyether sulfone substrate (10×10 cm; available from Sumitomo-Bakelite) with attached ITO patterned electrodes having a lapped polyimide orientation layer formed thereon. A continuous resin dam with a liquid crystal injection opening was formed using the aforesaid polyester resin on the exterior edge of the substrate at the same time as the resin structural nodules were formed. Then, spacers approximately 6.5 μm in size (MICROPEARL SP-2065; Sekisui fine Chemicals, Ltd.) were dispersed over the entire substrate surface to a uniform density of about 200/mm² via a dry dispersion method.

Thereafter, a liquid crystal material comprising 2.3 wt % chiral material S-811 added to nematic liquid crystal MLC6068-000 (available from Merck) was dropped using a liquid discharging device (dispenser) onto a substrate heated to 80° C. which is above the equilibrium transition temperature (70° C.) of the chiral nematic liquid crystal so as to not overlay the resin structural nodules.

The opposite substrate was a polyether sulfone resin substrate provided with ITO electrodes having a lapped polyimide orientation layer formed on the surface thereof, and both substrates were overlaid with said electrode surfaces confronting one another at a twist angle of 250° in a vacuum, then the substrates were heated to the softening temperature of the polyester resin, i.e., 150° C., and pressure of 0.2 kg/cm² was applied thereto for 5 min, after which the substrates were cooled to room temperature while maintaining the pressure application to form the cell. A polarization panel and phase difference panel were provided on the top and bottom of the cell to maximize the contrast ratio to obtain the STN type liquid crystal light modulation element shown in FIG. 11.

The obtained element was lighter in weight and more flexible than the elements using two glass substrates. A force of 10 kg/cm² was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 hr at −25° C.

EXAMPLE 20

A silicon oxide insulation layer was formed on the surface of a glass substrate (10×10 cm) having ITO electrodes patterned at a line width of 280 μm and pitch of 300 μm via photolithography. Using a thermoplastic polyester resin PES-360S30 (available from Three Bond K.K.), stripe-like resin structural nodules about 40 μm in width and pitch of 150 μm were formed along the stripes of the patterned electrodes of the substrate via a screen printing method. A continuous resin dam with a liquid crystal injection opening was formed using the aforesaid polyester resin on the exterior edge of the substrate at the same time as the resin structural nodules were formed. Then, spacers approximately 7.5 μm in size (MICROPEARL SP 2065; available from Sekisui fine Chemicals, Ltd.) were dispersed over the entire substrate surface to a uniform density of about 100/mm$^2$ via a dry dispersion method.

Thereafter, a liquid crystal material comprising 24.5 wt % chiral material S-811 added to nematic liquid crystal E-31LV (available from Merck) was dropped using a liquid discharging device (dispenser) onto a substrate heated to 70° C. which is above the equilibrium transition temperature (65° C.) of the chiral nematic liquid crystal so as to not overlay the resin structural nodules.

Then, an identical insulation layer was formed on the opposite glass substrate provided with ITO patterned electrodes, and both substrates were overlaid with said electrode surfaces confronting one another at a such that the stripes were crossed in a vacuum, then the substrates were heated to the softening temperature of the polyester resin, i.e., 150° C., and pressure of 0.2 kg/cm$^2$ was applied thereto for 5 min, after which the substrates were cooled to room temperature while maintaining the pressure application to obtain the cholesteric liquid crystal light modulation element shown in FIG. 12 expressing a selective reflecting wavelength of green color at 550 nm.

A force of 10 kg/cm$^2$ was applied as external pressure to the aforesaid liquid crystal light modulation element, but no expansion or contraction of the spacing between substrates was observed after the external pressure was removed, and no irregularities were noted. There were likewise no changes in the drive voltage observed before or after external pressure application. No air bubbles were observed after this liquid crystal light modulation element was stored for 24 0hr at −25° C.

Reference Example 3

Spacers approximately 6.5 μm in size (MICROPEARL SP-2065; available from Sekisui fine Chemicals, Ltd.) were dispersed to a uniform dispersion density of about 100/mm$^2$ via a dry dispersion method over the entire surface of a glass substrate (10×10 cm) with ITO patterned electrodes and a polyimide insulation layer formed on the surface thereof. A liquid crystal/resin compound material comprising 2.3 wt % chiral material S-811 (available from Merck) added to nematic liquid crystal MLC6-68-000 (available from Merck) and light-curing resin R-128H (available from Nippon Kayaku K.K.) and photopolymerization initiator IRGACURE 184 (Ciba Giegy, Inc.) in a mix ratio of 80:19:1 was applied to the substrate via a liquid crystal dispenser.

The opposite substrate was similarly a glass substrate provided with ITO electrodes having a rubbed polyimide orientation layer formed on the surface thereof, and both substrates were overlaid with said electrode surfaces confronting one another at a twist of 250°, then the substrates were pressed to disperse the liquid crystal/resin solution over the entire substrate surface. Then a photo mask having an opening and shaped to function as seal wall of the liquid crystal cell was formed on the cell containing the liquid crystal/resin solution so as to have a 40 μm diameter circular opening at a pitch of 300 μm arranged on the edge area, and the cell was irradiated through the photomask by ultraviolet light of an intensity of 15 mW/cm$^2$ for 60 sec to form the liquid crystal/resin compound layer.

Microscopic examination revealed resin structure formed within the cell corresponding to the opening of the photo mask. The top and bottom substrates were easily peeled apart by pressing one substrate in a horizontal direction relative to the other substrate.

Reference Example 4

Spacers approximately 6.5 μm in size (MICROPEARL SP-2065; available from Sekisui fine Chemicals, Ltd.) were dispersed to a uniform dispersion density of about 100/mm$^2$ via a dry dispersion method over the entire surface of a glass substrate (10×10 cm) with ITO patterned electrodes and a polyimide insulation layer formed on the surface thereof. Then, a mixture of sealant XN-21-S (available from Mitsui Toatsu Chemicals, Ltd.) and the same spacers as above was used to form a liquid crystal cell seal wall at the edges of the substrate via a screen printing method. A liquid crystal injection opening was provided in the seal wall.

The opposite substrate was similarly a glass substrate provided with ITO electrodes having a lapped polyimide orientation layer formed on the surface thereof, and both substrates were overlaid with said electrode surfaces confronting one another at a twist of 250°, then the substrates were pressed together and maintained for 90 min in an atmosphere heated to 190° C., then cooled to room temperature while maintaining the pressure to harden the seal and obtain an empty cell.

A liquid crystal/resin compound comprising 2.3 wt % chiral material S-811 (available from Merck), added to nematic liquid crystal MLC6068-000 (available from Merck) ad light-curing resin R-128H (available from Nippon Kayaku K.K.) and photopolymerization initiator IRGACURE 184 (available from Ciba Giegy Inc.) in a mixture ratio of 80:19:1 was injected between the top and bottom substrates from the provided opening via a vacuum injection method.

Then a photo mask having an opening and shaped to function as seal wall of the liquid crystal cell was formed on the cell containing the liquid crystal/resin solution so as to have a 40 μm diameter circular opening at a pitch of 300 μm arranged on the edge area, and the cell was irradiated through the photomask by ultraviolet light of an intensity of 15 mW/cm$^2$ for 60 sec to form the liquid crystal/resin compound layer and obtain a liquid crystal light modulation element.

Microscopic examination revealed resin structure formed within the cell corresponding to the opening of the photo mask. The top and bottom substrates were easily peeled apart by pressing one substrate in a horizontal direction relative to the other substrate. The liquid crystal light modulation element was stored for 96 hr in an atmosphere heated to 70° C., and when examined by polarizing microscope liquid crystal were found between the substrate and the resin structure; the resin structure was peeled away from the substrate to reveal liquid crystal material penetration between the substrate and the resin structure.

Reference Example 5

Spacers approximately 6.5 μm in size (MICROPEARL SP-2065; available from Sekisui Fine Chemicals, Ltd.) were dispersed to a uniform dispersion density of about 100/mm$^2$ via a dry dispersion method over the entire surface of a glass substrate (10×10 cm) with ITO patterned electrodes and a polyimide insulation layer formed on the surface thereof. Then, a mixture of sealant XN-21-S (available from Mitsui Toatsu Chemicals, Ltd.) and the same spacers as above was used to form a liquid crystal cell seal wall at the edges of the substrate via a screen printing method. A liquid crystal injection opening was provided in the seal wall.

The opposite substrate was similarly a glass substrate provided with ITO electrodes having a rubbed polyimide orientation layer formed on the surface thereof, and both substrates were overlaid with said electrode surfaces confronting one another at a twist of 250°, then the substrates were pressed together and maintained for 90 min in an atmosphere heated to 190° C., then cooled to room temperature while maintaining the pressure to harden the seal and obtain an empty cell.

A liquid crystal/resin compound comprising 2.3 wt % chiral material S-811 (available from Merck), added to nematic liquid crystal MLC6068-000 (available from Merck) and light-curing resin R-128H (available from Nippon Kayaku K.K.) and photopolymerization initiator IRGA-CURE 184 (available from Ciba Giegy Inc.) in a mixture ratio of 80:19:1 was injected between the top and bottom substrates from the provided opening via a vacuum injection method.

Then a photo mask having an opening and shaped to function as seal wall of the liquid crystal cell was formed on the cell containing the liquid crystal/resin solution so as to have a 40 $\mu$m diameter circular opening at a pitch of 300 $\mu$m arranged on the edge area, and the cell was irradiated through the photomask by ultraviolet light of an intensity of 15 mW/cm$^2$ for 60 sec to form the liquid crystal/resin compound layer and obtain a liquid crystal light modulation element.

Microscopic examination revealed resin structure formed within the cell corresponding to the opening of the photo mask. When the phase transition temperature of the liquid crystal light modulation element was measured a drop to about 62° C. was noted. The top and bottom substrates were peeled apart and the liquid crystal removed, and FT-IR analysis detected a peak of the component containing only a monomer of the light-curing resin TC-110S. Many bright spots were observed and the display was average.

In all the liquid crystal light modulation elements produced in examples 1–20, the thermoplastic resin structural nodules maintained the substrates with adequate strength and suitable flexibility, so as to produce virtually no change in the gap between substrates, and provide an extremely stable display (light modulation) which is not influenced by the environment or external force. Furthermore, since the resin structural nodules are arranged based on a predetermined arrangement principle within the modulation region, the substrates are maintained with sufficient strength without affecting the display quality.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A liquid crystal light modulation element comprising:
   a pair of substrates at least one of which is transparent; and
   a liquid crystal modulating layer interposed between said substrates, said liquid crystal modulating layer being provided with a liquid crystal material for light modulation, a plurality of spacers of a first predetermined size for maintaining a gap between said substrates, and a plurality of resin structural nodules each of which has a second predetermined size in a range from two times to two hundred times the first predetermined size, a main component of each resin structural nodule being a thermoplastic high molecular material, said resin structural nodules being arranged within a light modulating region based on a predetermined principle to support and adhere said pair of substrates.

2. The liquid crystal light modulation element of claim 1, wherein said liquid crystal material is a cholesteric liquid crystal material.

3. The liquid crystal light modulation element of claim 2, wherein said cholesteric liquid crystal material is a composite of a nematic liquid crystal material and a chiral ingredient.

4. The liquid crystal light modulation element of claim 1, wherein said resin structural nodules include said spacers therein.

5. The liquid crystal light modulation element of claim 1, further comprising:
   a plurality of electrodes defining a plurality of pixels of said liquid crystal light modulating element,
   wherein said resin structural nodules are arranged so as to correspond to positions of said pixels.

6. The liquid crystal light modulation element of claim 1, wherein each of said resin structural nodules has a column shape, and said resin structural nodules are arranged at a predetermined interval.

7. The liquid crystal light modulation element of claim 1, wherein each of said resin structural nodules has a strip shape extending in a first direction, and said resin structural nodules are aligned in a second direction orthogonal to said first direction at a predetermined interval.

8. The liquid crystal light modulation element of claim 1, further comprising a seal member provided between said substrates and surrounding said light modulating region, said seal member being for preventing said liquid crystal material from leaking from said light modulating region.

9. The liquid crystal light modulation element of claim 8, wherein a main component of said seal member is said thermosetting thermoplastic high molecular material.

10. A method for manufacturing a light modulation element, said method comprising the steps of:
   (a) arranging spacers on at least one of a pair of substrates to provide a desired gap between said substrates, and forming resin structural nodules of a thermoplastic high molecular material which are thicker than a thickness of a light modulation layer on at least one of said substrates within a light modulating region based on a predetermined arrangement principle;
   (b) overlaying one of said substrates on the remaining one of said substrates, heating said pair of substrates including said resin structural nodules to a temperature above a softening temperature of said thermoplastic high molecular material, and applying pressure on said pair of overlaid substrates; and
   (c) cooling said heated pair of substrates to a temperature less than the softening temperature of said thermoplastic high molecular material, thus forming a plurality of supporting resin structural nodules each having a size in a range from two times to two hundred times a size of said spacers.

11. The method of claim 10, wherein the arrangement of spacers and the formation of said resin structural nodules are executed in separate steps.

12. The method of claim 10, further comprising the step of:
(d) surrounding the light modulating region of said light modulating layer by a sealing member.

13. The method of claim 12, further comprising the step of:
(e) filling the light modulating region of said light modulating layer with a liquid crystal material.

14. The method of claim 13, wherein said liquid crystal material is a cholesteric liquid crystal material.

15. The method of claim 14, wherein said cholesteric liquid crystal material is a composite of a nematic liquid crystal material and a chiral ingredient.

16. The method of claim 10, wherein said resin structural nodules are arranged at a predetermined interval.

17. The method of claim 16, wherein each of said resin structural nodules has a column shape.

18. The method of claim 16, wherein each of said resin structural nodules has a strip shape.

19. A liquid crystal light modulation element comprising:
a pair of substrates at least one of which is transparent and at least one of which is flexible; and
a liquid crystal modulating layer interposed between said substrates, said liquid crystal modulating layer being provided with a liquid crystal material for light modulation, a plurality of spacers for maintaining a gap between said substrates at a predetermined size, and a plurality of resin structural nodules, a main component of each resin structural nodule is a thermoplastic high molecular material, said resin structural nodules being arranged within a light modulating region based on a predetermined principle to support and adhere said pair of substrates.

20. A liquid crystal light modulation element in accordance with claim 19, wherein both of said substrates are flexible.

21. A liquid crystal light modulation element in accordance with claim 19, wherein the at least one of said substrates which is flexible is made of a resin.

22. A method for manufacturing a light modulation element, said method comprising the steps of:
(a) providing a pair of substrates at least one of which is flexible;
(b) arranging spacers on at least one of said substrates to provide a desired gap between said substrates, and forming resin structural nodules of a thermoplastic high molecular material which are thicker than a thickness of a light modulation layer on at least one of said substrates within a light modulating region based on a predetermined arrangement principle;
(c) overlaying one of said substrates on the remaining one of said substrates, heating said pair of substrates including said resin structural nodules to a temperature above a softening temperature of said thermoplastic high molecular material, and applying pressure on said pair of overlaid substrates; and
(d) cooling said heated pair of substrates to a temperature less than the softening temperature of said thermoplastic high molecular material.

23. A method for manufacturing a light modulation element in accordance with claim 22, wherein both of said substrates are flexible.

24. A method for manufacturing a light modulation element in accordance with claim 22, wherein the at least one of said substrates which is flexible is made of a resin.

* * * * *

UNITED STATES PATENT AND TRADEMARK OFFICE
CERTIFICATE OF CORRECTION

PATENT NO. : 6,226,067 B1
DATED : May 1, 2001
INVENTOR(S) : Kenji Nishiguchi et al.

It is certified that error appears in the above-identified patent and that said Letters Patent is hereby corrected as shown below:

<u>Column 32,</u>
Line 46, delete "thermosetting".

Signed and Sealed this

Twentieth Day of November, 2001

Attest:

*Nicholas P. Godici*

NICHOLAS P. GODICI
*Attesting Officer*   *Acting Director of the United States Patent and Trademark Office*